United States Patent
Aoki

(10) Patent No.: US 10,979,153 B2
(45) Date of Patent: Apr. 13, 2021

(54) I/Q CALIBRATION METHOD AND APPARATUS

(71) Applicant: Samsung Electronics Co., Ltd., Gyeonggi-do (KR)

(72) Inventor: Yuichi Aoki, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/521,939

(22) Filed: Jul. 25, 2019

(65) Prior Publication Data

US 2020/0036454 A1 Jan. 30, 2020

(30) Foreign Application Priority Data

Jul. 25, 2018 (KR) ........................ 10-2018-0086502

(51) Int. Cl.
| | | |
|---|---|---|
| H04B 17/14 | (2015.01) | |
| H04L 5/00 | (2006.01) | |
| H04W 72/04 | (2009.01) | |

(52) U.S. Cl.
CPC ............. *H04B 17/14* (2015.01); *H04L 5/001* (2013.01); *H04L 5/0051* (2013.01); *H04W 72/048* (2013.01)

(58) Field of Classification Search
CPC .... H04W 72/048; H04L 5/001; H04L 5/0051; H04B 17/14
USPC ....................................................... 370/329
See application file for complete search history.

(56) References Cited

U.S. PATENT DOCUMENTS

| | | | |
|---|---|---|---|
| 8,295,845 B1 | 10/2012 | Abdollahi-Alibeik et al. | |
| 9,166,707 B2* | 10/2015 | Matsuura | H04L 27/364 |
| 9,882,661 B1* | 1/2018 | Gross | H04B 17/21 |
| 2014/0270002 A1* | 9/2014 | Schubert | H04L 1/0045 |
| | | | 375/320 |
| 2015/0030103 A1* | 1/2015 | Hormis | H04L 27/364 |
| | | | 375/296 |
| 2017/0264466 A1* | 9/2017 | Hosseini | H04L 25/0236 |
| 2019/0253282 A1* | 8/2019 | Hadaschik | H04W 64/003 |

* cited by examiner

*Primary Examiner* — Phong La
(74) *Attorney, Agent, or Firm* — The Farrell Law Firm, P.C.

(57) ABSTRACT

An apparatus and method are provided for a communication scheme for converging a 5G communication system for supporting a higher data transfer rate than a post-4G system with the IoT technology. A method includes configuring a loopback path between a transmitter and a receiver; transmitting a preconfigured signal from the transmitter to the receiver through the loopback path; identifying an image signal, wherein the image signal includes a distorted signal of the preconfigured signal; determining a gain error value and a phase error value based on the preconfigured signal and the image signal; and performing I/Q calibration based on the gain error value and the phase error value. A subcarrier in which the preconfigured signal is transmitted and a subcarrier in which the image signal is generated do not overlap.

12 Claims, 19 Drawing Sheets

(a)

(b)

(a)

(b)

1

I/Q CALIBRATION METHOD AND APPARATUS

CROSS-REFERENCE TO RELATED APPLICATION(S)

This application is based on and claims priority under 35 U.S.C. § 119 to Korean Patent Application No. 10-2018-0086502, filed on Jul. 25, 2018, in the Korean Intellectual Property Office, the entire disclosure of which is incorporated herein by reference.

BACKGROUND

1. Field

The disclosure relates to an in-phase/quadrature (I/Q) calibration method and apparatus.

2. Description of Related Art

In order to satisfy a wireless data traffic demand that has been increasing since commercialization of the $4^{th}$-generation (4G) communication system, efforts to develop an improved $5^{th}$-generation (5G) communication system or pre-5G communication system is being made. The 5G communication system or pre-5G communication system may be referred to as a beyond 4G network communication system or a post long term evolution (LTE) system.

In order to achieve a high data transfer rate, the 5G communication system is expected to be implemented in a mmWave band (e.g., 60 GHz band). In order to reduce a loss of electric waves and increase the transfer distance of electric waves in the mmWave band, beamforming, massive multiple-input and multiple-output (MIMO), full dimensional (FD)-MIMO, an array antenna, analog beam-forming and large scale antenna technologies are being discussed in the 5G communication system.

In order to improve a network of a system, technologies, such as an improved small cell, an advanced small cell, a cloud radio access network (RAN), an ultra-dense network, device to device communication (D2D), wireless backhaul, a moving network, cooperative communication, coordinated multi-point (CoMP) and reception interference cancellation, are being developed in the 5G communication system. In addition, hybrid frequency-shift keying (FSK) and quadrature amplitude modulation (QAM) (FQAM) and sliding window superposition coding (SWSC), which are advanced coding modulation (ACM) schemes, improved filter bank multi-carrier (FBMC), non-quadrature multiple access (NOMA), and sparse code multiple access (SCMA) are being developed in the 5G system.

In the 5G system, the support of various services for the existing 4G system is also taken into consideration. For example, representative services may include enhanced mobile broad band (eMBB), ultra-reliable and low latency communication (URLLC), massive machine type communication (mMTC), evolved multimedia broadcast/multicast service (eMBMS), etc. A system providing the URLLC service may be referred to as a URLLC system, and a system providing the eMBB service may be referred to as an eMBB system. Further, terms, such as service and system, may be interchangeably used.

From among the services, the URLLC service is newly taken into consideration in the 5G system, unlike the existing 4G system, and requires the satisfaction of ultra-high reliability (e.g., a packet error rate of about 10-5) and low latency (e.g., about 0.5 msec) conditions, compared to other services. In order to satisfy such strict requirements, the URLLC service may apply a shorter transmission time interval (TTI) than the eMBB service. Various operation methods using the TTI are taken into consideration.

The Internet has evolved from a human-centered connection network over which humans generate and consume information to the Internet of things (IoT) in which information is exchanged and processed between distributed elements, i.e., things. An Internet of everything (IoE) technology is also emerging in which a big data processing technology through a connection with a cloud server is combined with the IoT technology.

In order to implement the IoT, technical elements, such as the sensing technology, wired/wireless communication and network infrastructure, service interface technology and security technology, are required. Accordingly, technologies, such as a sensor network, machine to machine (M2M) and machine type communication (MTC) for a connection between things, are currently being researched. In the IoT environment, an intelligent Internet technology service that collects and analyzes data generated from connected things may be provided. The IoT may be applied to various fields, such as a smart home, a smart building, a smart city, a smart car or a connected car, a smart grid, health care, smart home appliances, and advanced medical services, through convergence and composition between the existing information technology (IT) and various industries.

Accordingly, various attempts to apply the 5G communication system to the IoT are being made. For example, 5G communication technologies, such as a sensor network, M2M and MTC, are implemented by schemes, such as beamforming, MIMO, and an array antenna. The application of a cloud wireless access network (WAN) as the aforementioned big data processing technology may be an example of the convergence between the 5G and IoT technologies.

SUMMARY

The disclosure has been made to address at least the above problems and provide at least the advantages described below.

An aspect of the disclosure is to provide a method and apparatus for I/Q calibration to be performed in real time.

Another aspect of the disclosure is to provide a method and apparatus for performing runtime calibration based on an environment change, such as a temperature variation, aging, or a voltage variation, in addition to factory calibration.

Another aspect of the disclosure is to provide a method and apparatus for continuously performing communication without being stopped during calibration.

In accordance with an aspect of the disclosure, an I/Q calibration method of a transceiver is provided, which includes configuring a loopback path between a transmitter and a receiver, transmitting a preconfigured signal from the transmitter to the receiver through the loopback path, identifying an image signal, wherein the image signal includes a distorted signal of the preconfigured signal, determining a gain error value and a phase error value based on the preconfigured signal and the image signal, and performing I/Q calibration based on the gain error value and the phase error value. A subcarrier in which the preconfigured signal is transmitted and a subcarrier in which the image signal is generated may not overlap.

In accordance with another aspect of the disclosure, a transceiver is provided for performing an in-phase/quadrature (I/Q) calibration. The transceiver includes a transmitter configured to transmit a preconfigured signal, a receiver configured to determine a gain error value and a phase error value based on the preconfigured signal, and a controller configured to configure a loopback path between a transmitter and a receiver, transmit the preconfigured signal from the transmitter to the receiver through the loopback path, identify an image signal, wherein the image signal includes a distorted signal of the preconfigured signal, determine a gain error value and a phase error value based on the preconfigured signal and the image signal, and perform I/Q calibration based on the gain error value and the phase error value. A subcarrier in which the preconfigured signal may be transmitted and a subcarrier in which the image signal may be generated may not overlap.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
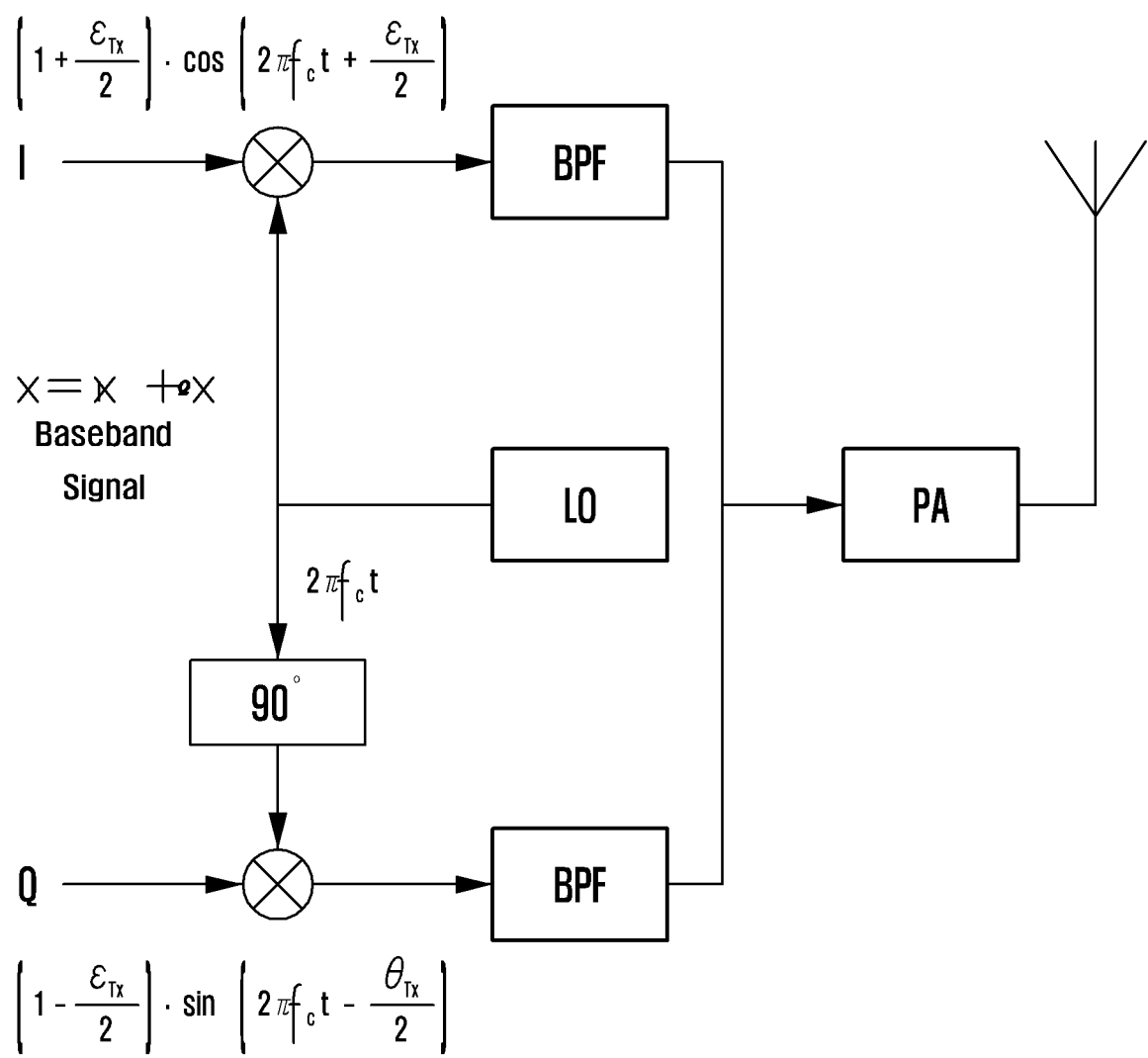
FIG. 1 illustrates a transmitter using I/Q modulation.

Hereinafter, various embodiments of the disclosure are described in detail with reference to the accompanying drawings.

In describing the embodiments, descriptions of content that are well known in the art to which the disclosure pertains and not directly related to the disclosure are omitted in order to avoid obscuring the disclosure.

For similar reasoning, in the accompanying drawings, some elements are enlarged, omitted, or depicted schematically. Further, the size of each element does not accurately reflect its real size. In the drawings, the same or similar elements may be assigned the same or similar reference numerals.

The merits and characteristics of the disclosure and a method for achieving the merits and characteristics will become more apparent from the embodiments described in detail in conjunction with the accompanying drawings. However, the disclosure is not limited to the disclosed embodiments, and may be implemented in various different ways. The embodiments are provided to complete the disclosure of the disclosure and to allow those skilled in the art to understand the category of the disclosure.

In the disclosure, each block of the flowchart illustrations and combinations of the blocks in the flowchart illustrations can be executed by computer program instructions. These computer program instructions may be mounted on a processor of a general purpose computer, a special purpose computer or other programmable data processing apparatus, so that the instructions executed by the processor of the computer or other programmable data processing apparatus execute the functions specified in the flowchart block(s). These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block(s). The computer program instructions may also be loaded on a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block(s).

Further, each block of the flowchart illustrations may represent a portion of a module, a segment, or a code, which includes one or more executable instructions for implementing a specified logical function(s). In some alternative implementations, the functions noted in the blocks may be performed out of order. For example, two blocks shown in succession may be executed substantially at the same time or the blocks may sometimes be executed in the reverse order, depending upon the functionality involved.

Herein, the term "unit" may refer software or a hardware component, such as a field programmable gate array (FPGA) or an application-specific integrated circuit (ASIC), and the "unit" may perform specific tasks. The "unit" may advantageously be configured to reside on an addressable storage medium and configured to operate on one or more processors. Accordingly, a "unit" may include components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Further, the components and "units" may be implemented to operate on one or more central processing units (CPUs) within a device or a security multimedia card. Further, a "unit" may include one or more processors.

The terms used in the following description are provided to help understanding the disclosure, and such specific terms may be changed into other forms without departing from the technical spirit of the disclosure.

A recent wireless communication system may use quadrature modulation using quadrature in-phase (I) and quadrature (Q) at the same time, for up conversion in which a signal to be transmitted shifts from a base band to a pass band and down conversion in which a signal shifts from a pass band to a base band. Quadrature modulation has an advantage in that it can transmit a double signal using one carrier, but may degrade communication system performance because mutual interference occurs in I/Q signals if a mismatch occurs between local oscillator (LO) in-phase and quadrature.

An I/Q mismatch may be divided into a gain mismatch and a phase mismatch. The gain mismatch refers to sizes of the I component and Q component of an LO being different. Further, the phase mismatch indicates that the I component and Q component of the LO are not quadrature because a difference between the phases of the LO I/Q is not 90°.

If an I/Q mismatch occurs in the quadrature modulator of a transceiver, error vector magnitude (EVM) deterioration occurs. Overall communication system performance may be degraded because a packet error rate (PER) increases.

A wireless communication system, such as mobile communication, uses a high degree of modulation, such as 16QAM, 64QAM, or 256QAM, in order to increase the data transmit rate. The calibration of a transceiver I/Q mismatch should be performed to guarantee smooth communication performance because modulation is more sensitive to a transceiver I/Q mismatch as the modulation has a higher degree.

Figure 2:
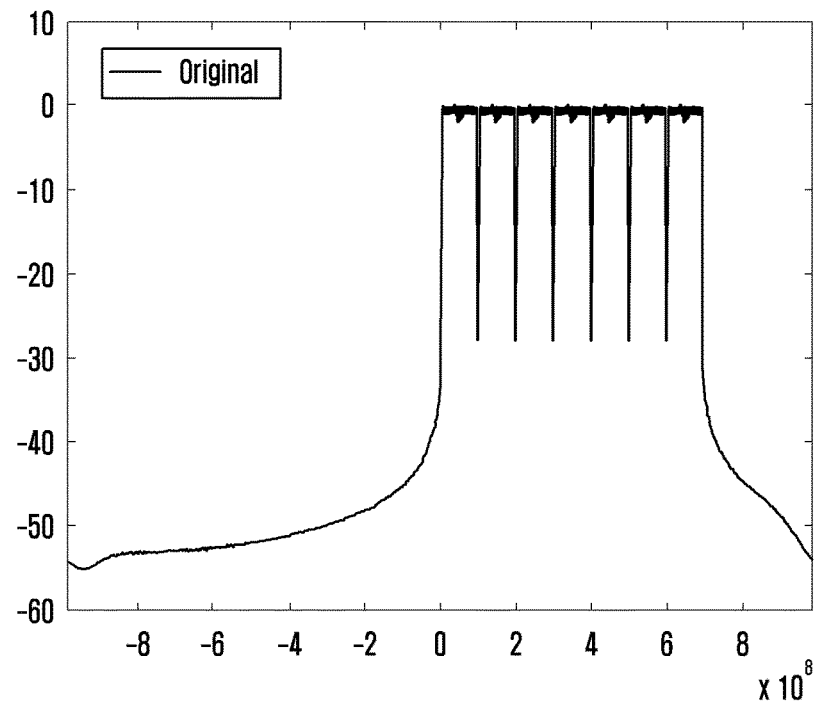
FIG. 2 illustrates a signal input to a transmitter and a signal in which an I/Q imbalance has occurred.
Figure 2:
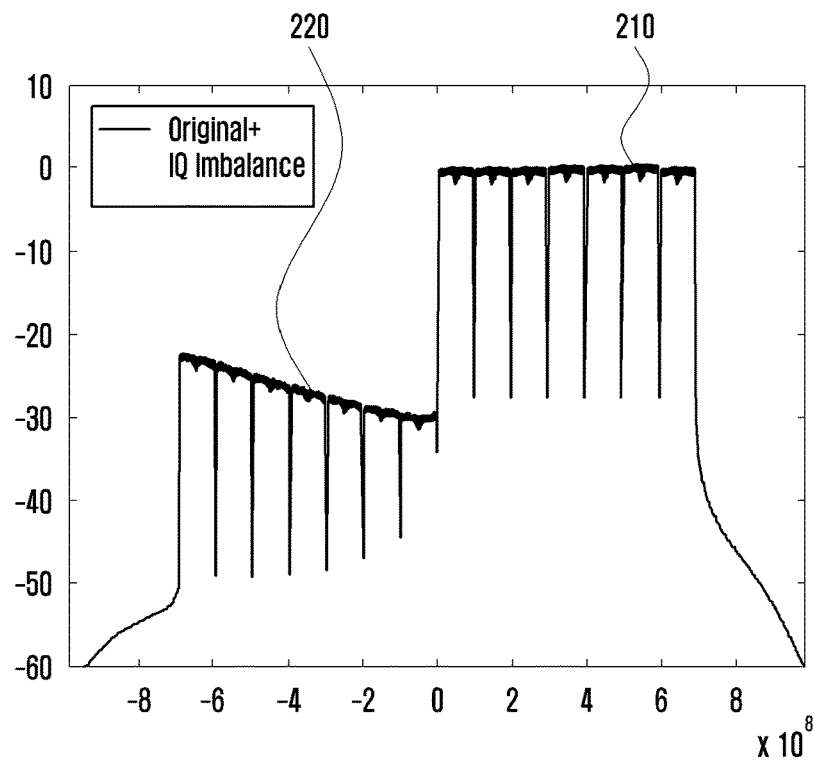
Figure 3:
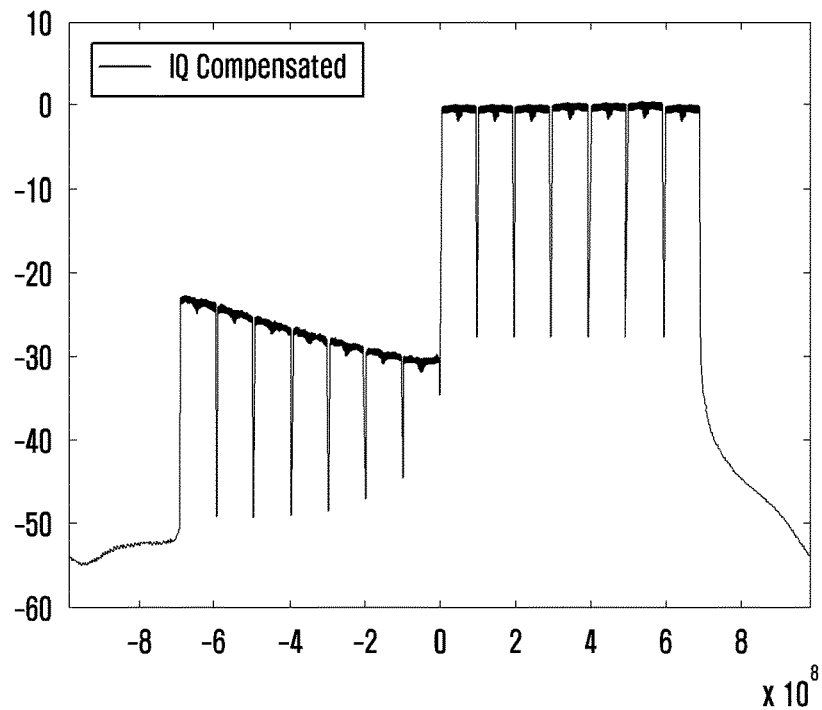
FIG. 3 illustrates an I/Q compensated signal and a signal in which an I/Q imbalance has occurred, to which an I/Q compensated signal has applied.
Figure 3:
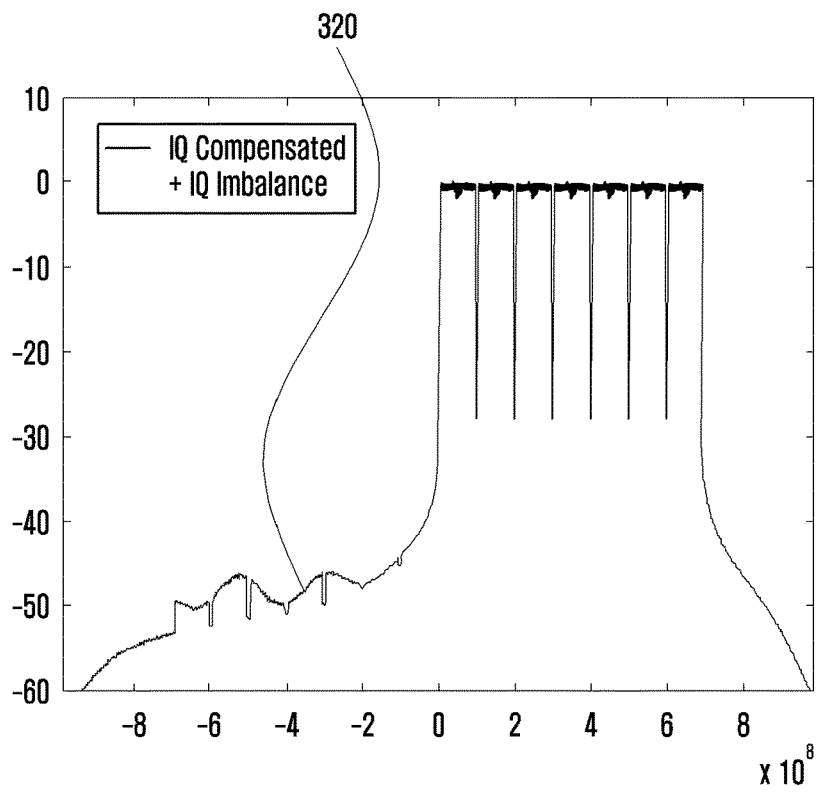

FIG. 1 illustrates a transmitter using I/Q modulation. FIG. 2 illustrates a signal input to a transmitter and a signal in which an I/Q imbalance has occurred. FIG. 3 illustrates an I/Q compensated signal and a signal in which an I/Q imbalance has occurred, to which an I/Q compensated signal has applied.

Referring to FIG. 1, a signal x), such as that illustrated in graph (a) of FIG. 2, may be input to the transmitter. As illustrated in FIG. 1, the input signal x) is output as an I signal and a Q signal through the in-phase and quadrature modulation of an LO.

However, a gain imbalance and a phase imbalance may occur in quadrature modulators and demodulators. For example, as illustrated in graph (b) of FIG. 2, an imbalance may occur in I/Q signals because an image signal 220, which is a distorted signal of the original signal, is additionally output to an original signal 210 that must be originally output. Accordingly, if an I/Q compensate signal, such as that illustrated in graph (a) of FIG. 3, is used, an image signal 320 may be reduced and output as illustrated in graph (b) of FIG. 3. Accordingly, I/Q mismatch calibration is necessary for system performance.

Figure 4:
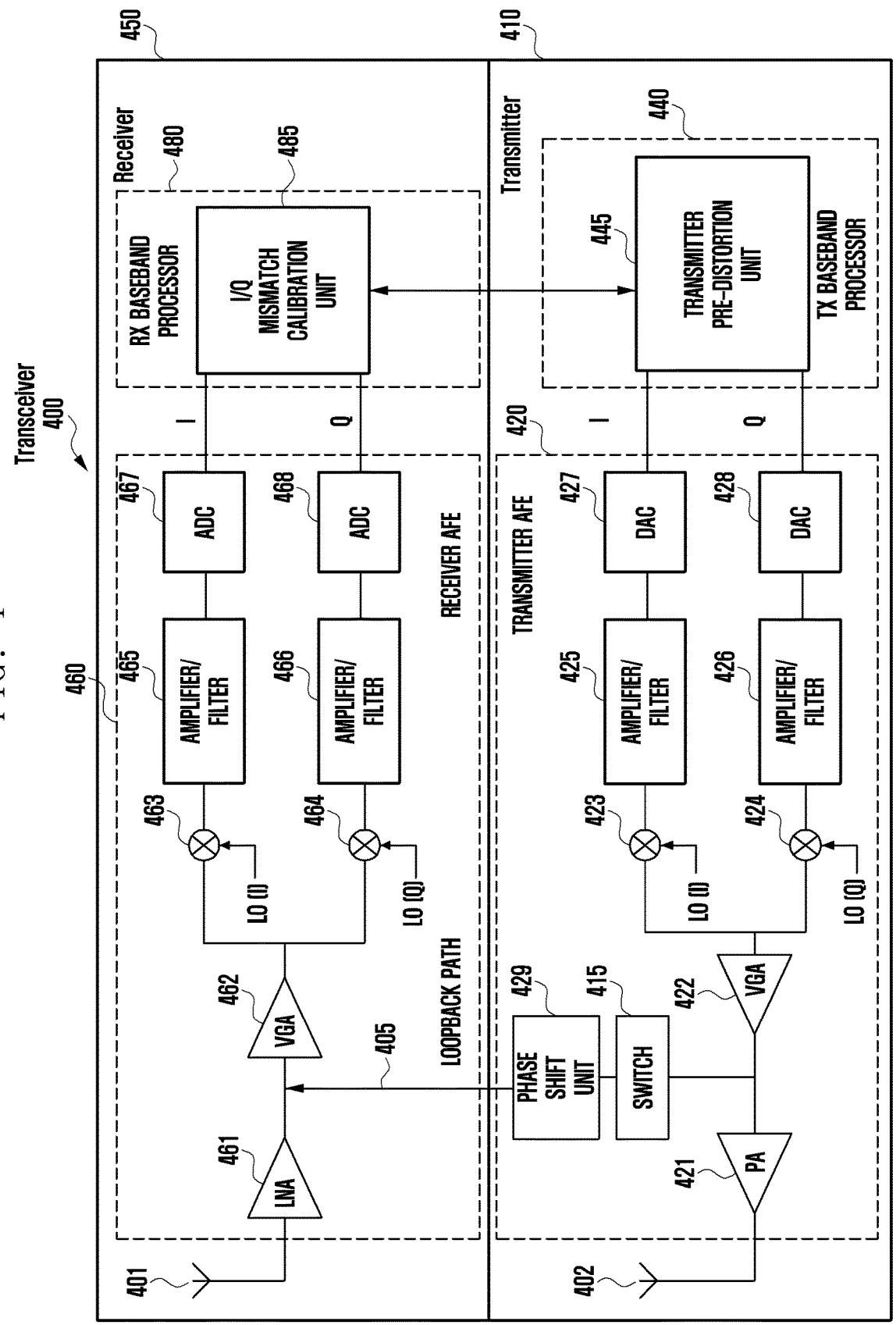
FIG. 4 illustrates a transceiver structure for I/Q mismatch calibration.

FIG. 4 illustrates a transceiver structure for I/Q mismatch calibration.

Referring to FIG. 4, a transceiver 400 includes a transmitter 410 and a receiver 450. The transmitter 410 includes a transmission (Tx) baseband controller 440, a transmitter analog front end (AFE) 420, and a Tx antenna 402. The Tx baseband controller 440 includes a transmitter pre-distortion unit 445. The transmitter AFE 420 includes digital to analog convertors (DACs) 427 and 428, amplifier/filters 425 and 426, up converters 423 and 424, a variable gain amplifier (VGA) 422, and a power amplifier (PA) 421.

The receiver 450 includes a reception (Rx) baseband processor 480, a receiver AFE 460, and an Rx antenna 401. The Rx baseband controller 480 includes an I/Q mismatch calibration unit 485. The receiver AFE 460 includes analog to digital convertors (ADCs) 467 and 468, amplifier/filters 465 and 466, down converters 463 and 464, a VGA 462, and a low noise amplifier (LNA) 461.

The transceiver 400 includes a phase shift unit 429 and a switch 415 between the up converters 423 and 424 of the transmitter 410 and down converters 463 and 464 of the receiver 450 of the transceiver (or radio frequency (RF) unit) in order to remove the I/Q mismatch of the transmitter 410. In this case, the phase shift unit 429 may receive a training sequence having a phase that has been shifted in 0° and/or 90° through a loopback path. The receiver 450 may estimate the I/Q mismatches of the transmitter 410 and the receiver 450 at the same time using the training sequence.

For example, the transmitter 410 may transmit a training signal, e.g., a first signal and a second signal, to the receiver 450 through the loopback path configured (formed) by turning on the switch 415 and connecting the phase shift unit 429. The phase shift unit 429 may add a phase to the second signal and provide the second signal to the receiver 450. The I/Q mismatch calibration unit 485 of the receiver 450 may identify a first I/Q mismatch and a second I/Q mismatch based on the received first signal and second signal. The I/Q mismatch calibration unit 485 may calculate the I/Q mismatch parameters of the transmitter 410 and the receiver 450 based on a first I/Q measurement value and a second I/Q measurement value. The I/Q mismatch calibration unit 485 may provide an I/Q mismatch parameter value of the transmitter 410 to the transmitter pre-distortion unit 445 of the transmitter 410. The transmitter pre-distortion unit 445 may perform a pre-distortion processing operation based on the received value.

If the transceiver 400 performs I/Q calibration using a given training signal as described above, the transceiver 400 stops communication while performing calibration. That is, the transceiver 400 stops transmission and reception operations with a different network entity while it performs I/Q calibration using a given training signal, not a signal for transmission and reception with the different network entity.

Factory calibration may not be suitable for an environment in which a transceiver is actually used due to a temperature variation, aging, or a voltage variation. Power-on calibration has problems in that it requires calibration attributable to a temperature variation and a base station (BS) is not frequently powered off. Accordingly, runtime calibration may be appropriate if communication is not stopped.

Accordingly, in an I/Q calibration method according to an embodiment of the disclosure, an original signal may be used as a training signal if a subcarrier in which an image signal, i.e., a distorted signal of the original signal (or main signal), is generated and a subcarrier in which the original signal is transmitted do not overlap.

Figure 5:
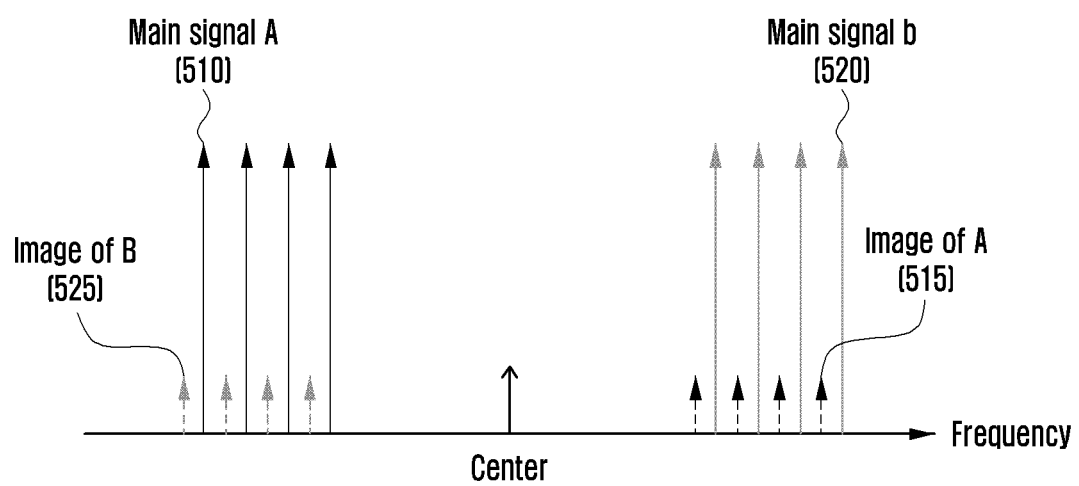
FIG. 5 illustrates a signal for I/Q calibration according to an embodiment.
Figure 6:
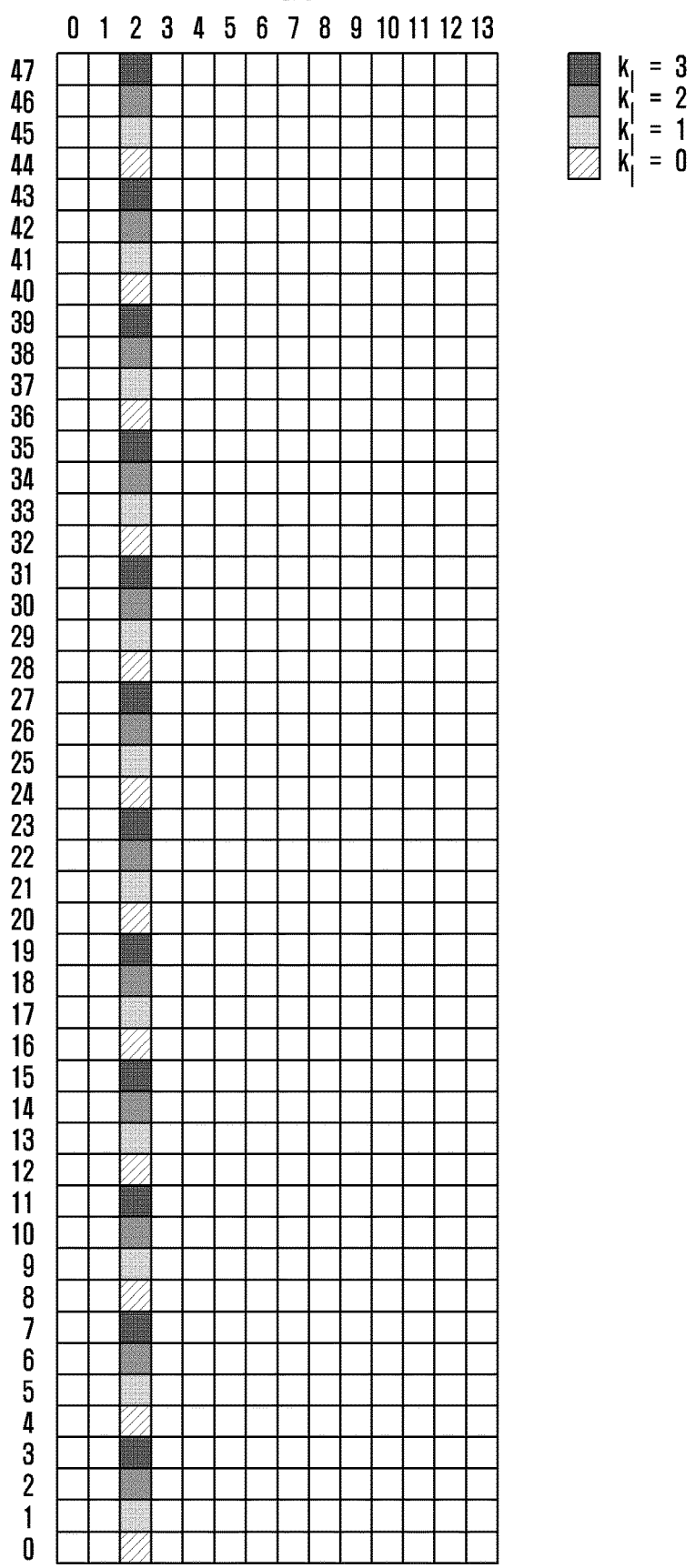
FIG. 6 illustrates a demodulation reference signal (DMRS) for I/Q calibration according to an embodiment.

FIG. 5 illustrates a signal for I/Q calibration according to an embodiment. FIG. 6 illustrates a DMRS for I/Q calibration according to an embodiment.

Referring to FIG. 5, an original signal may be used for I/Q calibration if a subcarrier in which an image signal, i.e., a distorted signal of the original signal (or main signal), is generated and a subcarrier in which the original signal is transmitted do not overlap.

For example, an original signal A 510 may be flipped on the basis of a center frequency, in order to generate an image signal A 515. An original signal B 520 may also be flipped on the basis of a center frequency, in order to generate an image signal B 525. In this case, the original signal A 510 and the original signal B 520 may be the same signal transmitted at given intervals on a frequency domain. Accordingly, if a subcarrier in which the original signals 510 and 520 are transmitted and a subcarrier in which the image signals 515 and 525 are transmitted do not overlap, as illustrated in FIG. 5, runtime calibration may be performed using the signal.

If the transceiver is used in a UE, the transceiver may use a DMRS for I/Q calibration. Although a method of performing I/Q calibration using a DMRS is described below, the disclosure is not limited thereto, and I/Q calibration may be performed using an original signal not overlapping an image signal, i.e., a distorted signal of the original signal (or main signal).

FIG. 6 illustrates a demodulation reference signal (DMRS) for I/Q calibration according to an embodiment. Specifically, FIG. 6 illustrates resource allocation of a DMRS in a 5G new radio (NR) system.

Referring to FIG. 6, a DMRS may be used for runtime calibration because it is periodically transmitted in communication.

One resource block (RB) is configured with 12 subcarriers. In one RB of an extended physical uplink control channel (xPUSCH) resource, a DMRS may be transmitted in the 3 of the 12 subcarriers in a frequency domain, and may be transmitted in the third symbol in a time domain. 100 RBs may configure 1 component carrier (CC), and 8 CCs may be used for transmission.

If a value k, is 0, a DMRS may be mapped to the subcarriers 0, 4, 8, . . . , 40, 44, . . . 592, 596, 601, 604, . . . 1193, 1197 of one CC. In this case, the No. 600 subcarrier may be a null subcarrier. The DMRS may be mapped to corresponding subcarriers of a CC #0 to a CC #7 and transmitted.

The image signal of the DMRS transmitted in the CC #0 may appear in the CC #7. If a DMRS is mapped to the subcarriers 0, 4, 8, . . . , 40, 44, . . . 592, 596, 601, 604, . . . 1193, 1197 of the CC #0 and transmitted, image signals may appear in the subcarriers 1200, 1196, 1192, . . . 1160, 1156, . . . 608, 604, 599, 595, . . . , 7, 3 of the CC #7. Likewise, the image signal of a DMRS transmitted in the CC #1 may appear in the CC #6. The image signal of a DMRS transmitted in the CC #2 may appear in the CC #5. The image signal of a DMRS transmitted in the CC #3 may appear in the CC #4. The image signal of a DMRS transmitted in the CC #4 may appear in the CC #3. The image signal of a DMRS transmitted in the CC #5 may appear in the CC #2. The image signal of a DMRS transmitted in the CC #6 may appear in the CC #1. The image signal of a DMRS transmitted in the CC #7 may appear in the CC #0.

As described above, an image signal may be used as information for calculating an I/Q mismatch because it appears in a subcarrier not overlapping a subcarrier in which the DMRS signal is transmitted.

Figure 7:
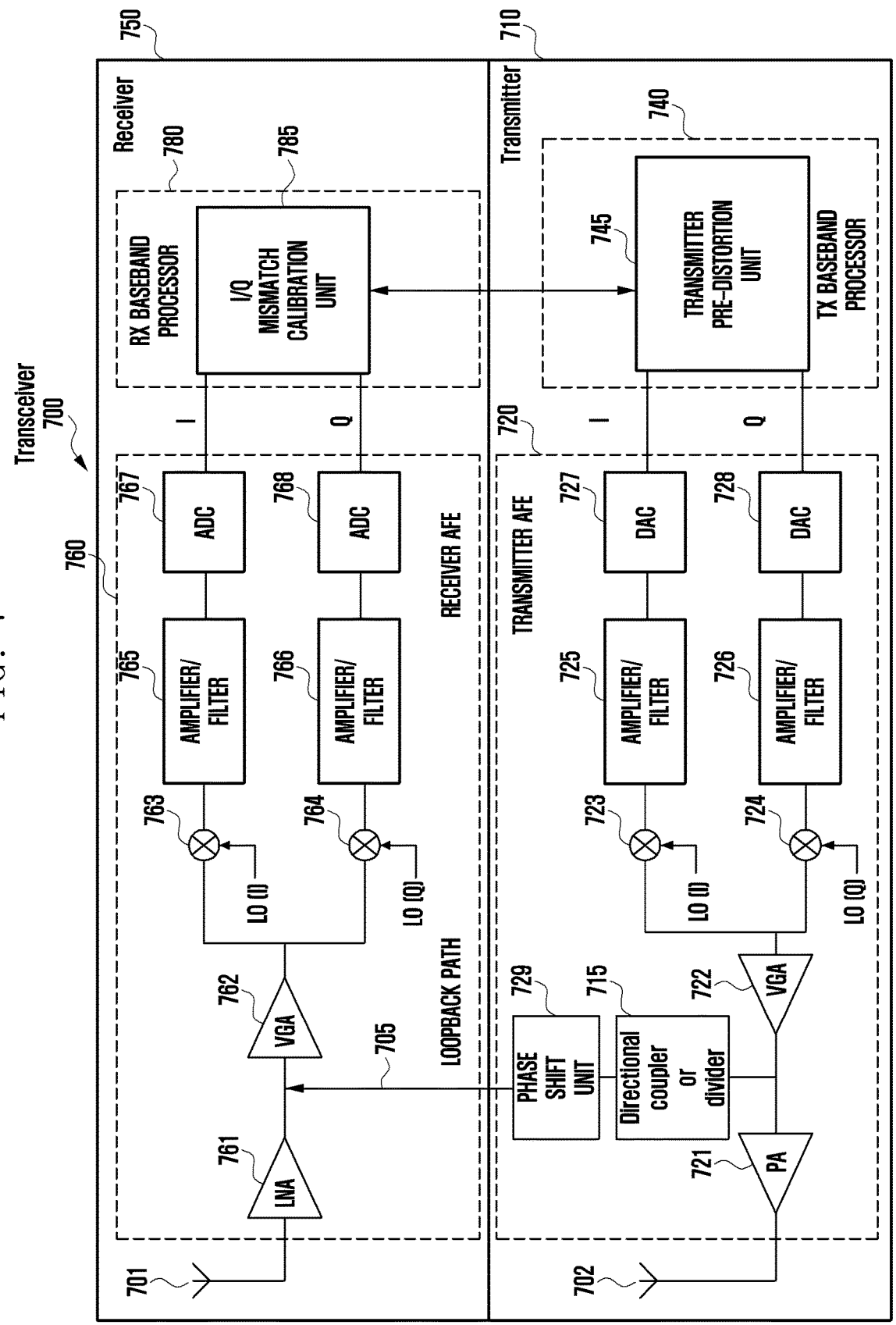
FIG. 7 illustrates a transceiver structure for I/Q mismatch calibration according to an embodiment.

FIG. 7 illustrates a transceiver structure for I/Q mismatch calibration according to an embodiment.

Referring to FIG. 7, a transceiver 700 includes a transmitter 710 and a receiver 750. The transmitter 710 includes a Tx baseband controller 740, a transmitter AFE 720, and a Tx antenna 702. The Tx baseband controller 740 includes a transmitter pre-distortion unit 745. The transmitter AFE 720 includes DACs 727 and 728, amplifier/filters 725 and 726, up converters 723 and 724, a VGA 722, and a PA 721.

The receiver 750 includes an Rx baseband processor 780, a receiver AFE 760, and an Rx antenna 701. The Rx baseband controller 780 includes an I/Q mismatch calibration unit 785. The receiver AFE 760 includes ADCs 767 and 768, amplifier/filters 765 and 766, down converters 763 and 764, a VGA 762, and an LNA 761.

The Tx baseband controller 740 may perform baseband modulation on a signal to be transmitted. The transmitter pre-distortion unit 745 may function to remove an I/Q mismatch influence in a transmission signal based on an I/Q mismatch estimation value of the transmitter.

The DACs 727 and 728 function to convert a digital signal into an analog signal. The amplifier/filter 725 and 726 amplify and filter an analog transmission signal. The up converters 723 and 724 convert a baseband signal into a pass band signal. The VGA 722 adjusts output power of the transmitter. The PA 721 amplifies a transmission signal to higher power in order to transmit the transmission signal to the Tx antenna 702.

The LNA 761 reduces noise of a received signal. The VGA 762 amplifies a received signal to a proper power. The down converters 763 and 764 convert a pass band signal into a baseband signal. The amplifier/filters 765 and 766 amplify and filter a received signal. The ADCs 767 and 768 convert analog signals into digital signals.

The I/Q mismatch calibration unit 785 of the receiver may compensate for an I/Q mismatch influence in a received signal based on an I/Q mismatch estimation value of the receiver.

The transceiver 700 also includes a phase shift unit 729 and a directional coupler or divider 715 between the up converters 723 and 724 of the transmitter 710 and the down converters 763 and 764 of the receiver 750 in order to remove the I/Q mismatch of the transmitter 710. The phase shift unit 729 may perform a phase shift on an original signal in 0° and/or 90°, and may provide the original signal to the receiver 750. The receiver 750 that has received the shifted signal through a loopback path may estimate the I/Q mismatches of the transmitter 710 and the receiver 750 at the same time.

The transceiver 700 does not use a special training sequence for the I/Q mismatch estimation, but may perform I/Q calibration in real-time using an original signal. To this end, the transmitter 710 may perform I/Q calibration by transmitting a preconfigured (given) signal from among the signals transmitted through the antenna 702, to the receiver 750, through the coupler or divider 721. The preconfigured (given) signal is a signal whose image signal does not overlap an original signal as described above.

Figure 8:
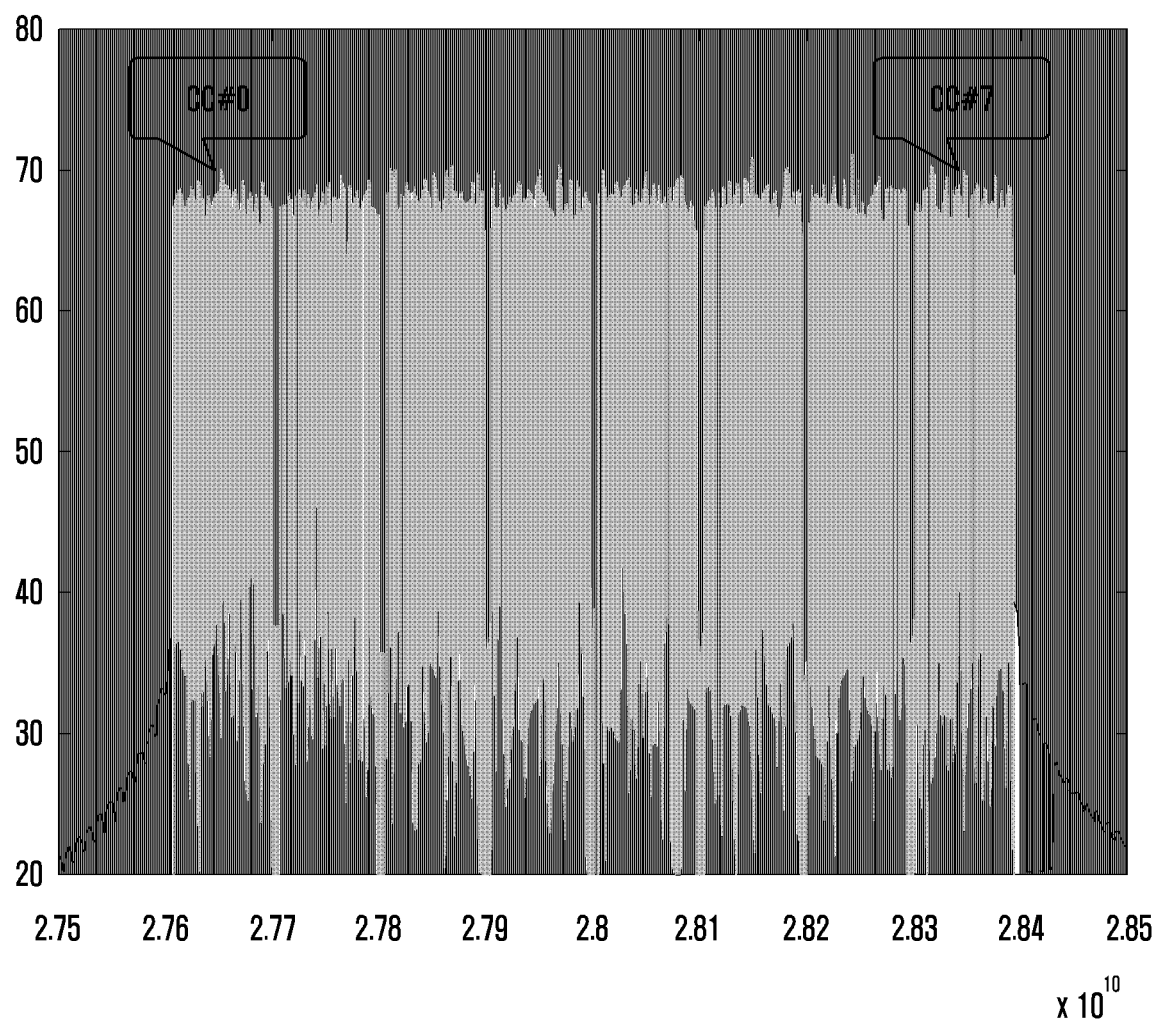
FIG. 8 illustrates timing of a signal for I/Q calibration according to an embodiment.

FIG. 8 illustrates timing of a signal for I/Q calibration according to an embodiment.

For example, the transceiver 700 may use a timing correlation in order to find a signal used to perform I/Q calibration. The timing correlation may be used to find the timing of a signal transmitted in each CC because each CC has different timing due to a delay difference, such as a signal path.

Referring to FIG. 8, the image signal of an original signal (or mirror signal) transmitted in a CC #0 is positioned in a CC #7, so timing correlation is performed in the CC #0. That is, an image signal (or mirror signal) transmitted in the CC #7 may be found based on timing in which the original signal of the CC #0 is transmitted.

If an I/Q imbalance is frequency-dependent, timing correlation may be performed in order to find the image signals of signals transmitted in all the CC #0 to the CC #3.

Alternatively, in order to perform I/Q imbalance calibration, only the results of timing correlation in the CC #0 may be used.

Figure 9:
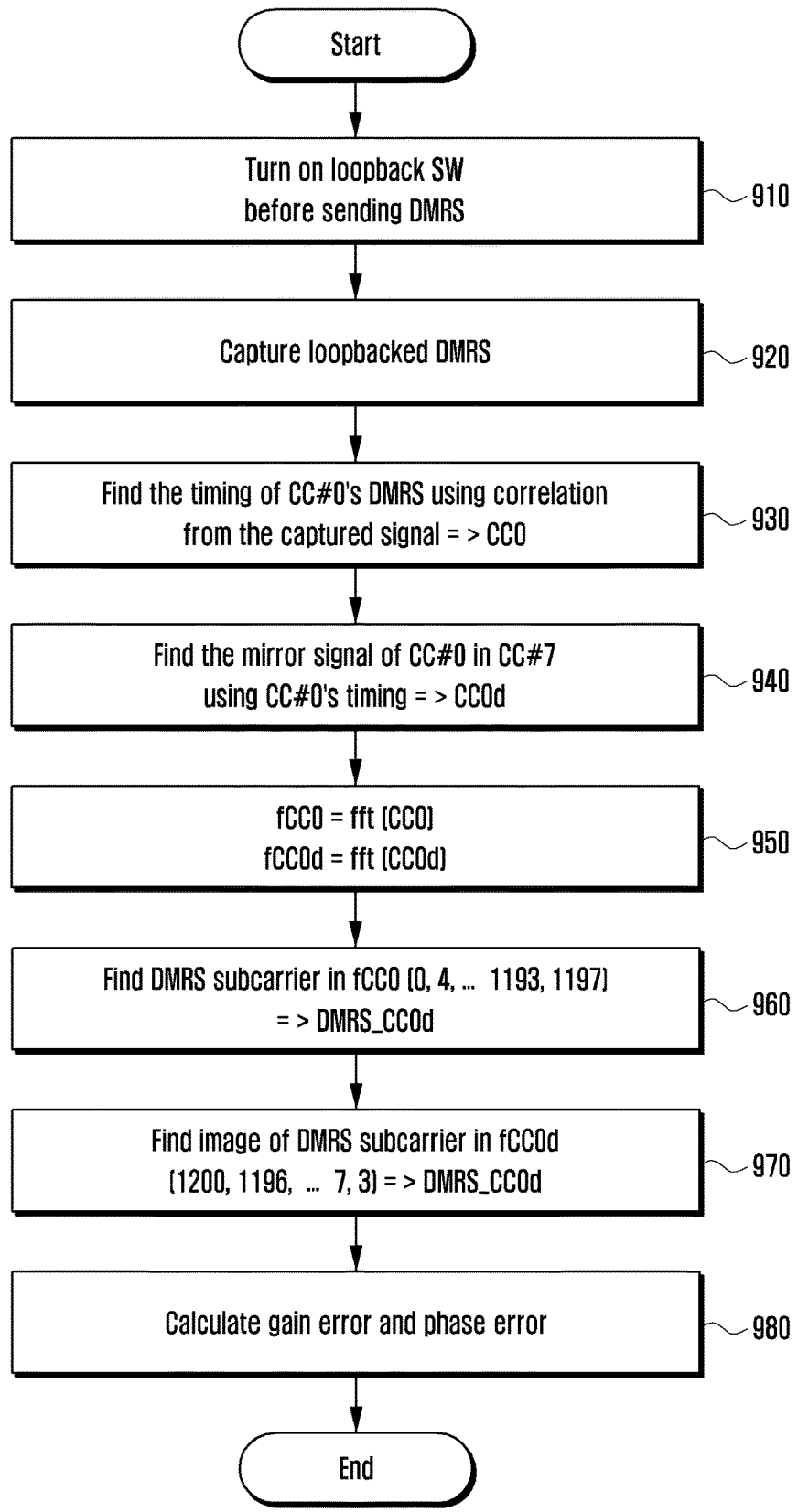
FIG. 9 illustrates an error calculation method for I/Q calibration according to an embodiment.

FIG. 9 illustrates an error calculation method for I/Q calibration according to an embodiment. For example, the method of FIG. 9 will be described below as being performed by the transceiver of FIG. 7, but is not limited thereto.

Referring to FIG. 9, at step 910, the transceiver 700 turns on a (loopback) switch 715 prior to transmitting a DMRS. The switch 715 may be the directional coupler or divider 715.

At step 920, the transceiver 700 captures a loopbacked DMRS.

At step 930, the transceiver 700 finds the DMRS timing of a CC #0 in the signal (DMRS), captured at step 920, based on timing correlation. The found DMRS signal is referred to as a CC0.

At step 940, the transceiver 700 finds an image signal (or a mirror signal), corresponding to the original signal (DMRS) of the CC #0, in a CC #7 based on the DMRS timing of the CC #0. The image signal is denoted as CC0d.

At step 950, the transceiver 700 captures an original signal (fCC0) transformed by performing fast Fourier transform (FFT) on the CC0, and captures an image signal (fCC0d) transformed by performing FFT on the CC0d.

At step 960, the transceiver 700 finds a DMRS subcarrier in which the original signal (fCC0) is transmitted. A subcarrier in which a DMRS is transmitted is denoted as DMRS_CC0. For example, referring again to FIG. 6, the DMRS_CC0 subcarrier may be 0, 4, . . . , 1193, 1197, and the number of subcarriers DMRS_CC0 may be 300 because 100 RBs configure one CC and 8 CCs may be used for uplink transmission, as described above.

At step 970, the transceiver 700 finds an image DMRS subcarrier in which fCC0d is transmitted. A subcarrier in which an image DMRS is transmitted is denoted as DMRS_CC0d. For example, referring to FIG. 6, the DMRS_CC0d subcarrier may be 1200, 1196, . . . , 7, 3, and the number of subcarriers DMRS_CC0d may be 300 because 100 RBs configure one CC and 8 CCs may be used for uplink transmission, as described above.

At step 980, the transceiver 700 calculates a gain error and a phase error using the original DMRS signal (DMRS_CC0) and the image DMRS signal (DMRS_CC0d).

Figure 10A:
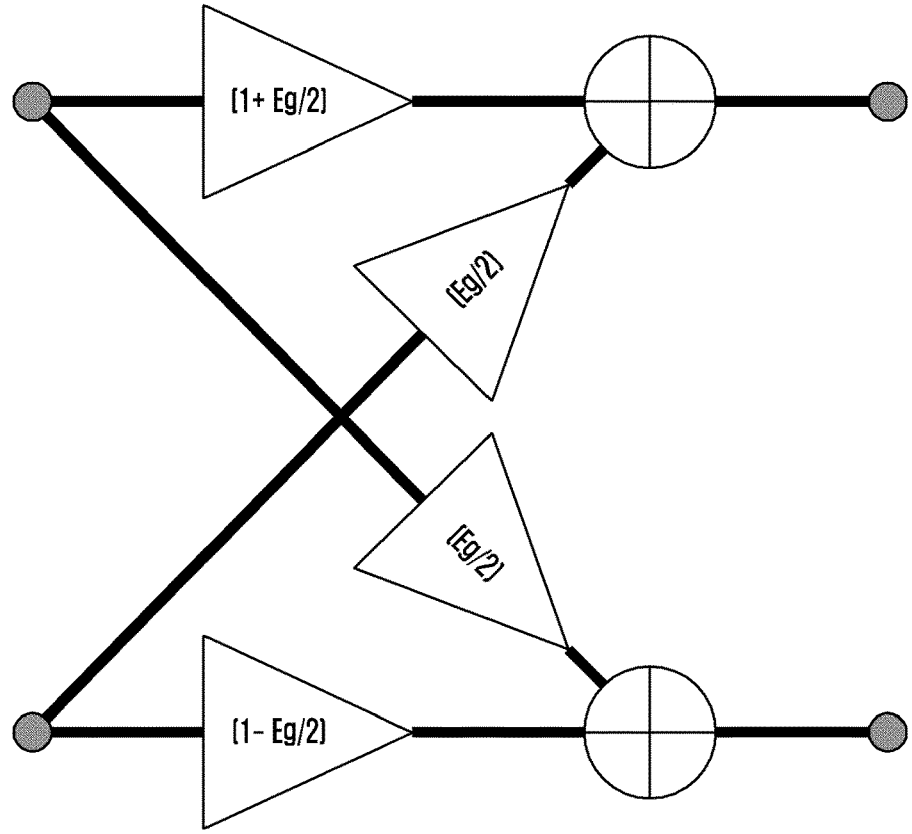
FIGS. 10A and 10B illustrate conceptual diagrams for calculating a gain error and a phase error according to an embodiment.

FIGS. 10A and B illustrate conceptual diagrams for calculating a gain error and a phase error according to an embodiment.

Figure 10B:
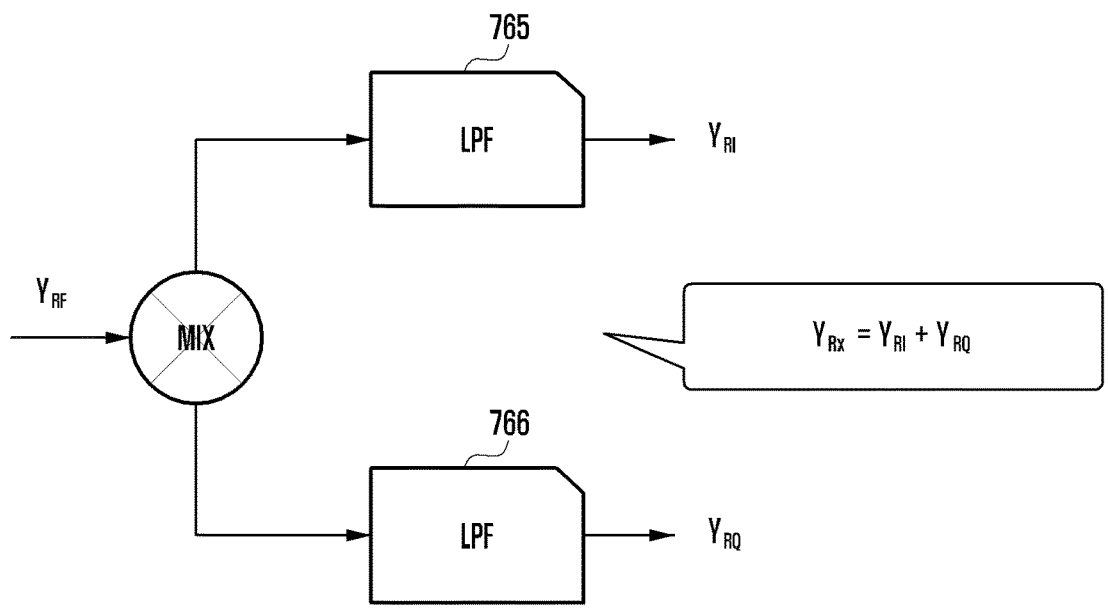

Specifically, FIG. 10B illustrates some elements of the receiver 750 of the transceiver 700, and FIG. 10A illustrates a configuration of a mixer (MIX) of FIG. 10B.

Referring to FIG. 10B, when an input signal ($Y_{RF}$) is input to the mixer (MIX), an I signal ($Y_{RI}$) and a Q signal ($Y_{RQ}$) may be output. A received signal ($Y_{Rx}$) may be the sum of the I signal ($Y_{RI}$) and the Q signal ($Y_{RQ}$) ($Y_{Rx}=Y_{RI}+Y_{RQ}$).

Assuming that an Rx gain error is $E_g$ and an Rx phase error is $E_p$, the received signal ($Y_{Rx}$) may be calculated as shown in Equation (1).

$$Y_{Rx} = \left(1 + \frac{E_g}{2} + j\frac{E_p}{2}\right) \cdot \text{real}(Y_{RF}) + j\left(1 - \frac{E_g}{2} + \frac{E_p}{2j}\right) \cdot \text{imag}(Y_{RF}) \quad (1)$$

$$= Y_{RF} + \left(\frac{E_g}{2} + j\frac{E_p}{2}\right)Y_{RF}^*$$

In this case, if an original signal (DMRS_CC0) is $e^{j\omega t}$, an image signal (DMRS_CC0d) may be $$\left(\frac{E_g}{2} + j\frac{E_p}{2}\right) \cdot e^{j\omega t}.$$

Accordingly, a real number value (real(DMRS_CC0d/ conj DMRS_CC0)) of a value obtained by dividing the image signal by a conjugate value of the original signal may be $E_g/2$. A received gain error value ($E_g$) may be the same as real(DMRS_CC0d/conj DMRS_CC0)*2.

An imaginary number value (imag(DMRS_CC0d/conj DMRS_CC0)) of a value obtained by dividing the image signal by the conjugate value of the original signal may be $E_p/2$. Accordingly, the received phase error value ($E_p$) may be the same as imag(DMRS_CC0d/conj DMRS_CC0)*2.

Figure 11:
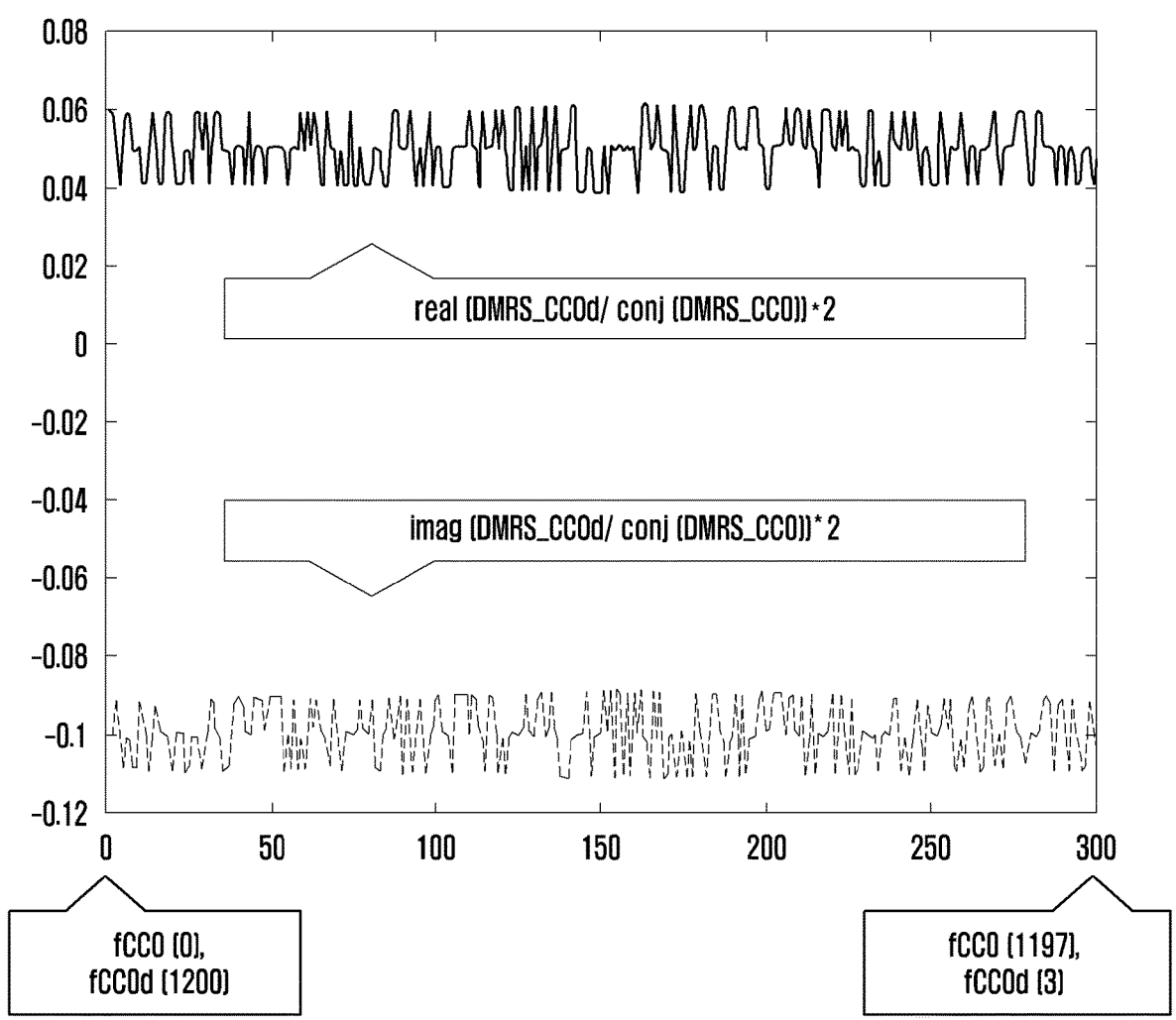
FIG. 11 illustrates a gain error and a phase error according to an embodiment.

FIG. 11 illustrates a gain error and a phase error according to an embodiment.

Referring to FIG. 11, an experiment example is provided, if a gain error ($E_g$) is assumed to be +0.05 and a phase error ($E_p$) is assumed to be −0.1 in the transceiver 700. In this case, original signals are transmitted in fCC0(0), fCC0(4), fCC0 (1197), and the image signals of the original signals may appear in fCC0d(1200), fCC0d(1196), . . . , fCC0d(3), respectively.

Figure 12:
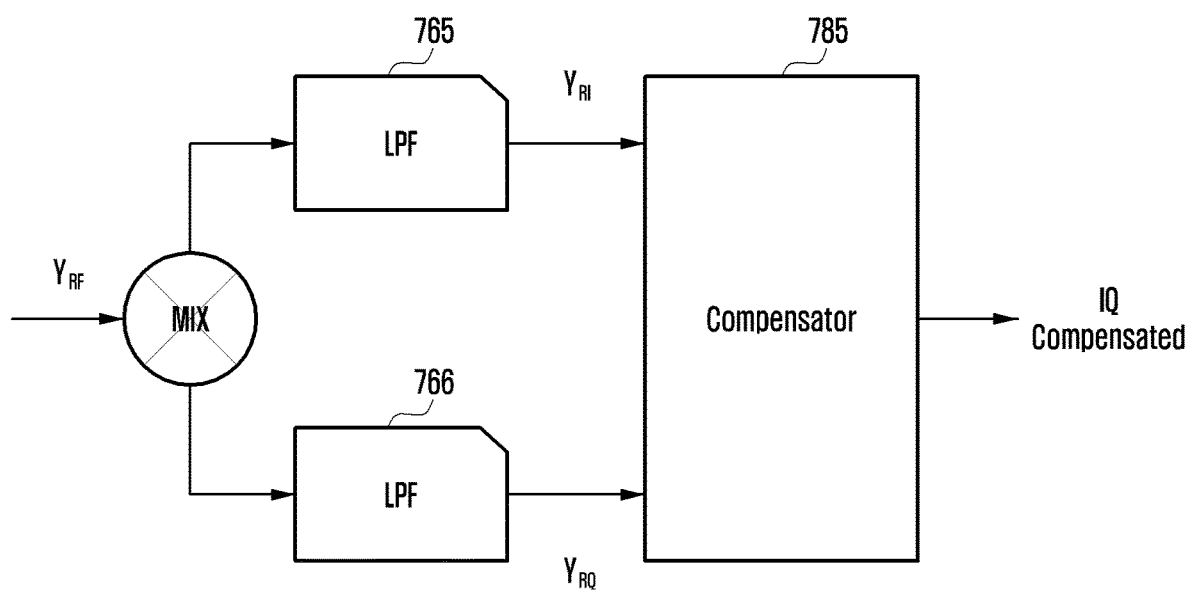
FIG. 12 illustrates a receiver according to an embodiment.

FIG. 12 illustrates elements of a receiver according to an embodiment.

Referring to FIG. 12, an I/Q mismatch calibration unit (or compensator) 785 may perform I/Q calibration by calculating a gain error and a phase error as described above.

Figure 13:
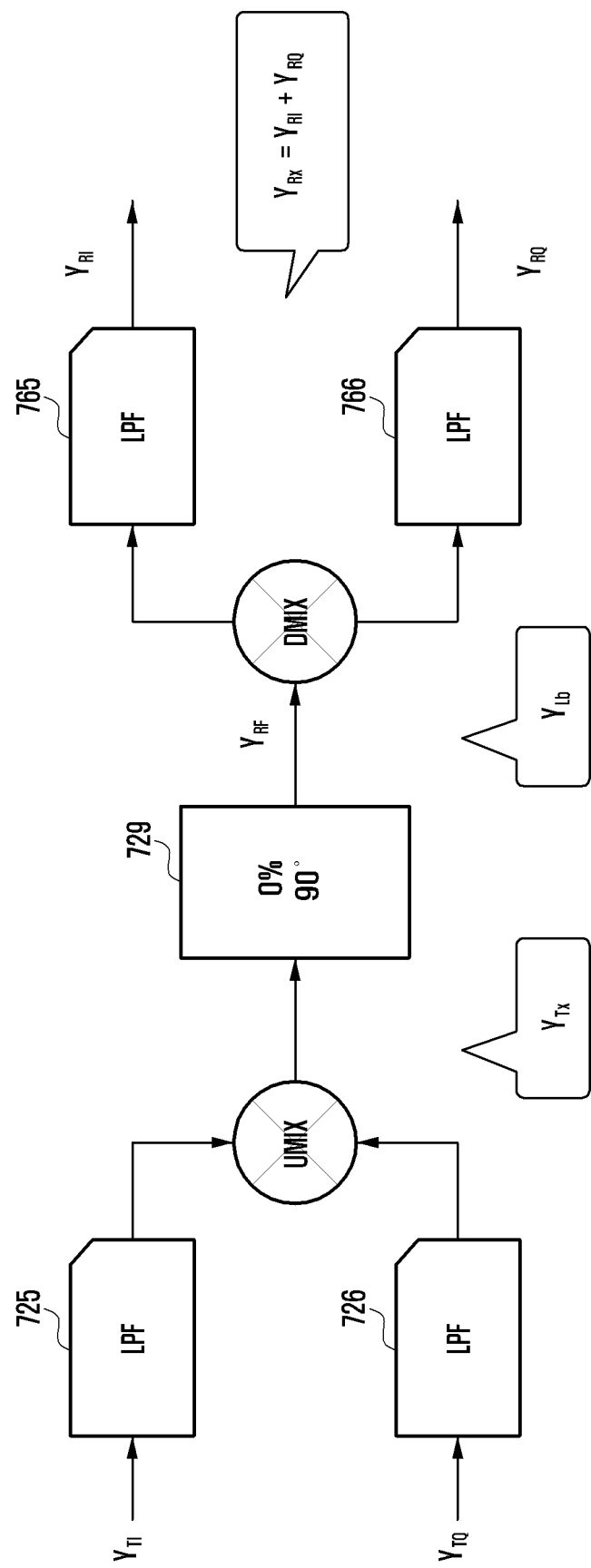
FIG. 13 illustrates a method of calculating a gain error and a phase error according to an embodiment.
Figure 14:
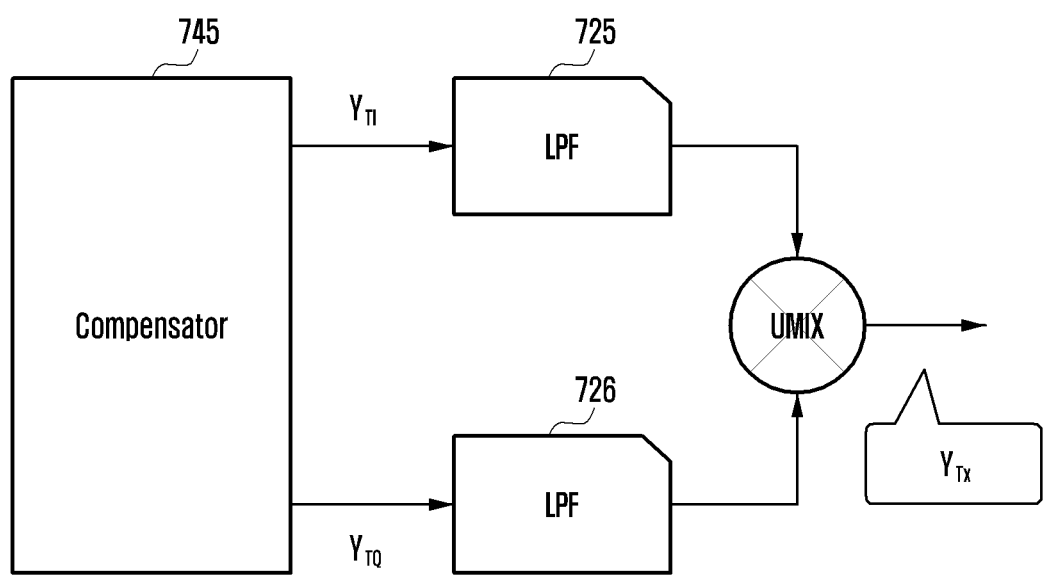
FIG. 14 illustrates elements of a transmitter according to an embodiment.

FIG. 13 illustrates a method of calculating a gain error and a phase error according to an embodiment. FIG. 14 illustrates some elements of a transmitter according to an embodiment.

Referring to FIG. 13, a Tx gain error may be assumed to be $\varepsilon_T$, a Tx phase error may be assumed to be $\varphi_T$, an Rx gain error may be assumed to be $\varepsilon_R$, an Rx phase error may be assumed to be $\varphi_R$, a phase shifter loss may be assumed to be $L_\varnothing$, and the phase of the phase shifter may be assumed to be $\varnothing$.

When a Tx I signal ($Y_{TI}$) and a Tx Q signal ($Y_{TQ}$) are input from the transmitter 710 to an up-mixer (UMIX), the UMIX may output a transmission signal ($Y_{Tx}$). The transmission signal ($Y_{Tx}$) may be calculated as shown in Equation (2).

$$Y_{Tx} = \left(1 + \frac{\varepsilon_T}{2} + j\frac{\varphi_T}{2}\right) \cdot Y_{TI} + j \cdot \left(1 - \frac{\varepsilon_T}{2} + \frac{\varphi_T}{2j}\right) \cdot Y_{TQ} \quad (2)$$

A loopback signal ($Y_{Lb}$) that is loopbacked and input to the receiver 750 may be calculated as shown in Equation (3).

$$Y_{Lb} = Y_{Tx} \cdot L_\varnothing e^{j\varnothing} \quad (3)$$

When the loopback signal ($Y_{Lb}$) is input to the down mixer (DMIX) of the receiver 750, an I signal ($Y_{RI}$) and a Q signal ($Y_{RQ}$) may be output. The received signal ($Y_{Rx}$) of the receiver 750 may be the sum of the I signal ($Y_{RI}$) and the Q signal ($Y_{RQ}$) ($Y_{Rx}=Y_{RI}+Y_{RQ}$). The received signal ($Y_{Rx}$) may be calculated as shown in Equation (4).

$$Y_{RX} = \left(1 + \frac{\varepsilon_R}{2} + j\frac{\varphi_R}{2}\right) \cdot \text{real}(Y_{Lb}) + j \cdot \left(1 - \frac{\varepsilon_R}{2} + \frac{\varphi_R}{2j}\right) \cdot \quad (4)$$

$$\text{imag}(Y_{Lb})$$

$$= \begin{bmatrix} L_\phi \cdot \cos\varphi \cdot \left\{\left(1 + \frac{\varepsilon_T}{2}\right)Y_{TI} + \frac{\varphi_T}{2}Y_{TQ}\right\} - L_\varphi \cdot \\ \sin\varphi\left\{\left(1 - \frac{\varepsilon_T}{2}\right)Y_{TQ} + \frac{\varphi_T}{2}Y_{TI}\right\} \end{bmatrix} \left(1 + \frac{\varepsilon_R}{2} + j\frac{\varphi_R}{2}\right) +$$

$$j \begin{bmatrix} L_\phi \cdot \cos\varphi \cdot \left\{\left(1 - \frac{\varepsilon_T}{2}\right)Y_{TQ} + \frac{\varphi_T}{2}Y_{TI}\right\} + L_\phi \cdot \\ \sin\varphi\left\{\left(1 + \frac{\varepsilon_T}{2}\right)Y_{TI} + \frac{\varphi_T}{2}Y_{TQ}\right\} \end{bmatrix} \left(1 - \frac{\varepsilon_R}{2} - j\frac{\varphi_R}{2}\right)$$

Further, Equation (4) may be expressed as Equation (5).

$$Y_{Rx} = L_\phi \left\{ e^{+j\phi} + \frac{e^{-j\phi}}{4}(\varepsilon_R \cdot \varepsilon_T - j\varepsilon_R \cdot \varphi_T + j\varphi_R \cdot \varepsilon_T + \varphi_R \cdot \varphi_T) \right\} \quad (5)$$

$$(Y_{TI} + jY_{TQ}) +$$

$$\frac{L_\phi}{2}\{(\varepsilon_R + j\varphi_R) \cdot e^{-j\phi} + (\varepsilon_T + j\varphi_T) \cdot e^{+j\phi}\}(Y_{TI} - jY_{TQ})$$

In Equation (5), the $$L_\phi \left\{ e^{+j\phi} + \frac{e^{-j\phi}}{4}(\varepsilon_R \cdot \varepsilon_T - j\varepsilon_R \cdot \varphi_T + j\varphi_R \cdot \varepsilon_T + \varphi_R \cdot \varphi_T) \right\}(Y_{TI} + jY_{TQ})$$

component is an original signal component. The $$\frac{L_\phi}{2}\{(\varepsilon_R + j\varphi_R) \cdot e^{-j\phi} + (\varepsilon_T + j\varphi_T) \cdot e^{+j\phi}\}(Y_{TI} - jY_{TQ})$$

component is an image signal component.

Assuming that the main signal is $Y_{R\_Main}$ and an error is very small, $$\frac{e^{-j\phi}}{4}(\varepsilon_R \cdot \varepsilon_T - j\varepsilon_R \cdot \varphi_T + j\varphi_R \cdot \varepsilon_T + \varphi_R \cdot \varphi_T)$$

becomes closer to 0. Accordingly, the main signal ($Y_{R\_Main}$) may be expressed as shown in Equation (6).

$$Y_{R\_Main} = \quad (6)$$

$$L_\phi \cdot e^{+j\phi} \cdot \left\{ 1 + \frac{e^{-2j\phi}}{4}(\varepsilon_R \cdot \varepsilon_T - j\varepsilon_R \cdot \varphi_T + j\varphi_R \cdot \varepsilon_T + \varphi_R \cdot \varphi_T) \right\}$$

$$(Y_{TI} - jY_{TQ}) \approx L_\phi \cdot e^{+j\phi} \cdot (Y_{TI} + jY_{TQ})$$

If an image signal is $Y_{R\_Image}$, the image signal ($Y_{R\_Image}$) may be expressed as shown in Equation (7).

$$Y_{R\_Image} = \frac{L_\phi}{2}\{(\varepsilon_R + j\varphi_R) \cdot e^{-j\phi} + (\varepsilon_T - j\varphi_T) \cdot e^{+j\phi}\}(Y_{TI} - jY_{TQ}) \quad (7)$$

$$\approx \frac{1}{2}\{(\varepsilon_R + j\varphi_R) \cdot e^{-j\phi} + (\varepsilon_T + j\varphi_T) \cdot e^{+j\phi}\}.$$

-continued $$(L_\phi \cdot e^{+j\phi} \cdot (Y_{TI} + jT_{TQ}) \cdot e^{-j\phi})^*$$

$$= \frac{1}{2}\begin{bmatrix} e^{-j\phi} & e^{+j\phi} \end{bmatrix}\begin{bmatrix} \varepsilon_R + j\varphi_R \\ \varepsilon_T + j\varphi_T \end{bmatrix} \cdot (Y_{R\_Main} \cdot e^{-j\phi})^*$$

Based on Equation (7), error values may be obtained as shown in Equation (8).

$$E(\omega) \approx A(\omega)^{-1} \cdot F_I(\omega) \quad (8)$$

If $Y_{TI} = \cos \omega t$ and $Y_{TQ} = \sin \omega t$, $$A(\omega) = \frac{1}{2} \cdot \begin{bmatrix} e^{-j\phi_0} & e^{+j\phi_0} \\ e^{-j\phi_{90}} & e^{+j\phi_{90}} \end{bmatrix},$$

$$E(\omega) = \begin{bmatrix} \varepsilon_R(\omega) + j \cdot \varphi_R(\omega) \\ \varepsilon_T(\omega) + j \cdot \varphi_T(\omega) \end{bmatrix}, \text{ and}$$

$$F_I(\omega) = \begin{bmatrix} F_{R\_Image\phi_0}(\omega) / \left(F_{R\_Main\phi_0}(-\omega) \cdot e^{-j\phi_0}\right)^* \\ F_{R\_Image\phi_{90}}(\omega) / \left(F_{R\_Main\phi_{90}}(-\omega) \cdot e^{-j\phi_{90}}\right)^* \end{bmatrix}$$

$F_{R\_Image}$ is an image signal, and $F_{R\_Main}$ is an original signal.

If the original signal (DMRS_CC0) is $e^{j\omega t}$, the image signal (DMRS_CC0d) may be $$\frac{1}{2}\begin{bmatrix} e^{-j\phi} & e^{+j\phi} \end{bmatrix}\begin{bmatrix} \varepsilon_R + j\varphi_R \\ \varepsilon_T + j\varphi_T \end{bmatrix} \cdot e^{-j(\phi+\omega t)}.$$

A Tx gain error $\varepsilon_T$, a Tx phase error $\varphi_T$, an Rx gain error $\varepsilon_R$, and an Rx phase error $\varphi_R$ may be calculated according to Equation (8).

The pre-distortion unit (or compensator) 745 of the transmitter 710 of FIG. 14 may perform I/Q calibration on a transmission signal based on the Tx gain error $\varepsilon_T$ and the Tx phase error $\varphi_T$.

The I/Q mismatch calibration unit (or compensator) 785 of the receiver 750 of FIG. 12 may perform I/Q calibration on a received signal based on the Rx gain error $\varepsilon_R$ and the Rx phase error $\varphi_R$.

Figure 15:
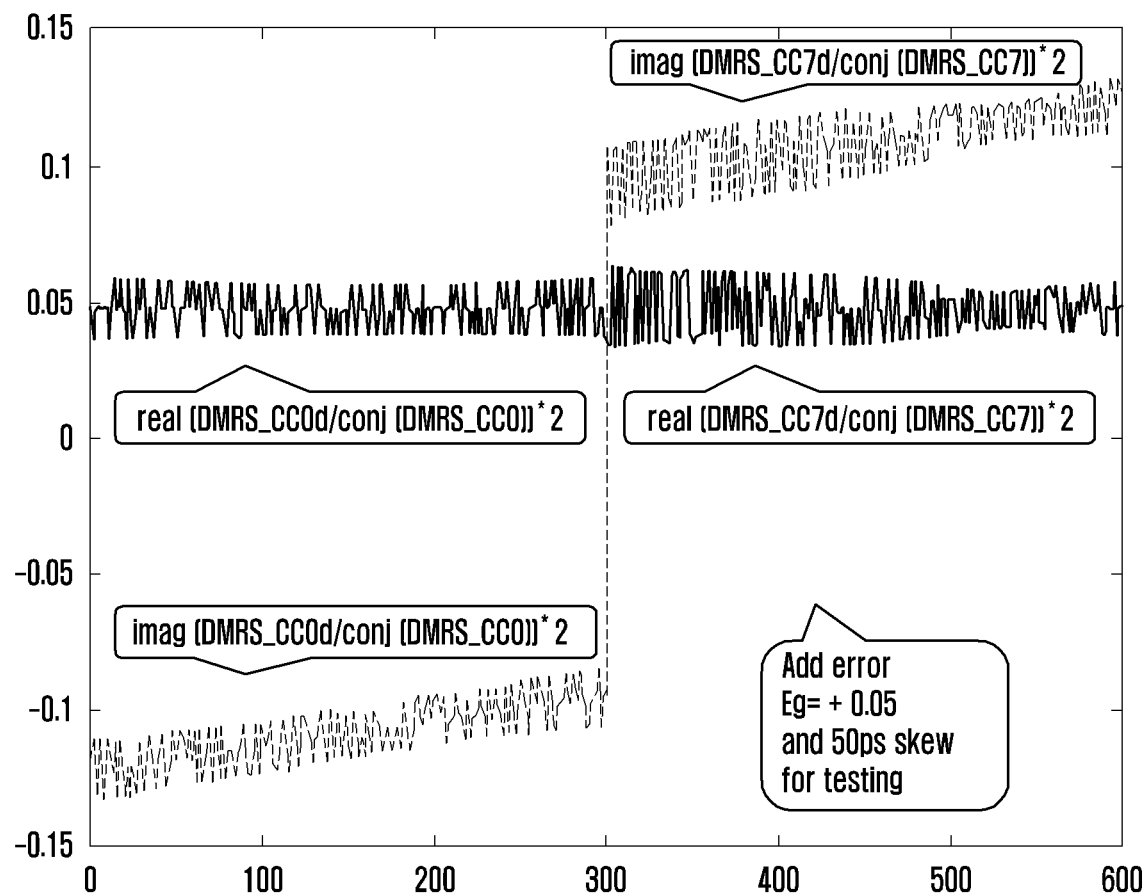
FIG. 15 illustrates a gain error and a phase error according to an embodiment.

FIG. 15 illustrates a gain error and a phase error according to an embodiment.

Referring to FIG. 15, if an I/Q mismatch is frequency-dependent, a gain error value and a phase error value may be calculated in a CC #0, a CC #1, a CC #2, a CC #3.

If all gain error and phase error values are calculated in the CC #0 and the CC #7, frequency selection latency of a loopback path may be reduced. I/Q timing distortion may be estimated through the calculation in the CC #0 and the CC #7.

FIG. 15 shows a gain error value (real(DMRS_CC0d/conj DMRS_CC0)*2) and a phase error value (imag (DMRS_CC0d/conj DMRS_CC0)*2), calculated in the CC #0, and a gain error value (real(DMRS_CC7d/conj (DMRS_CC7))*2) and a phase error value (imag (DMRS_CC7d/conj(DMRS_CC7))*2) calculated in the CC #7.

Figure 16:
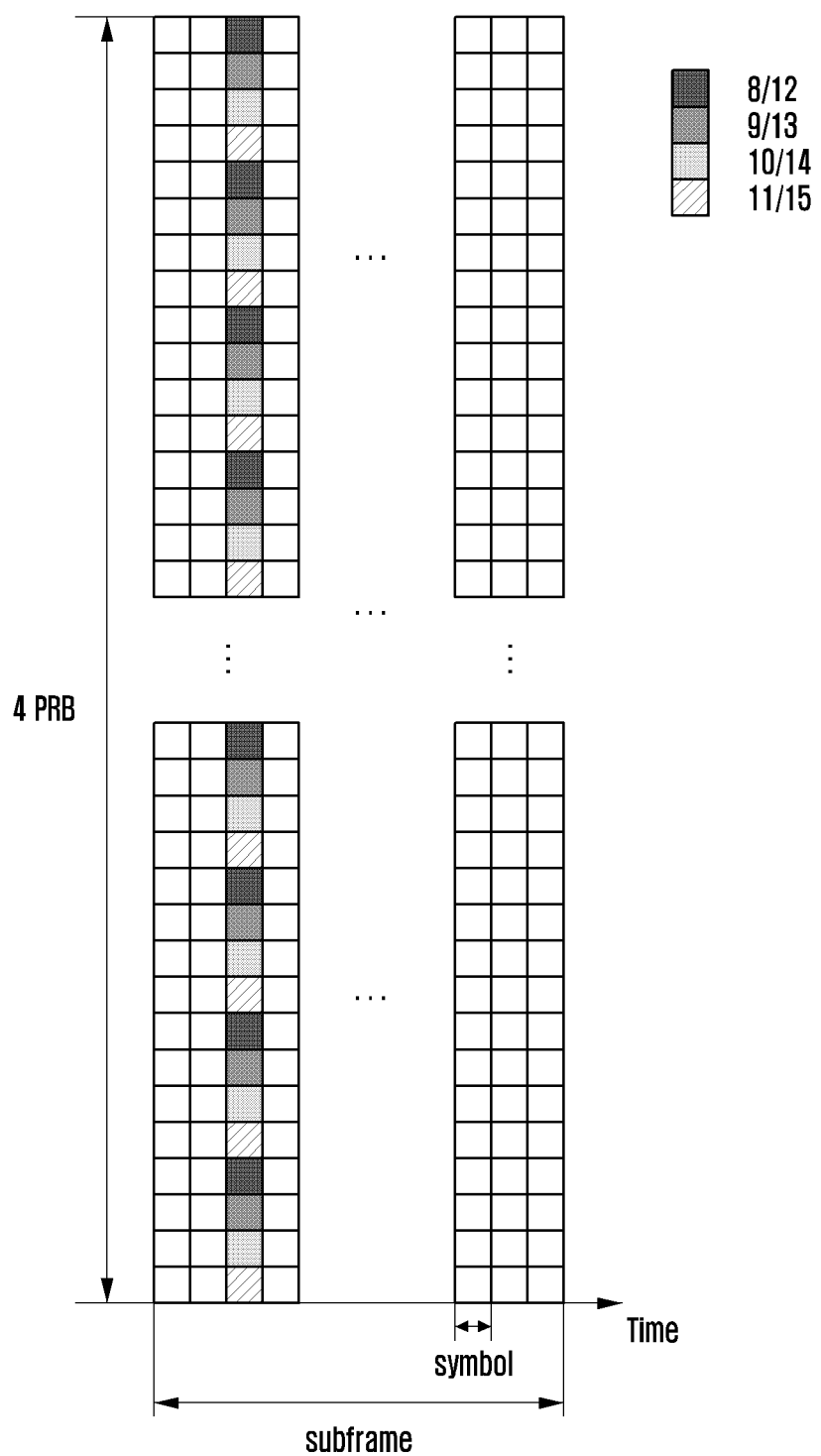
FIGS. 16 and 17 illustrate a signal for I/Q calibration according to an embodiment.
Figure 17:
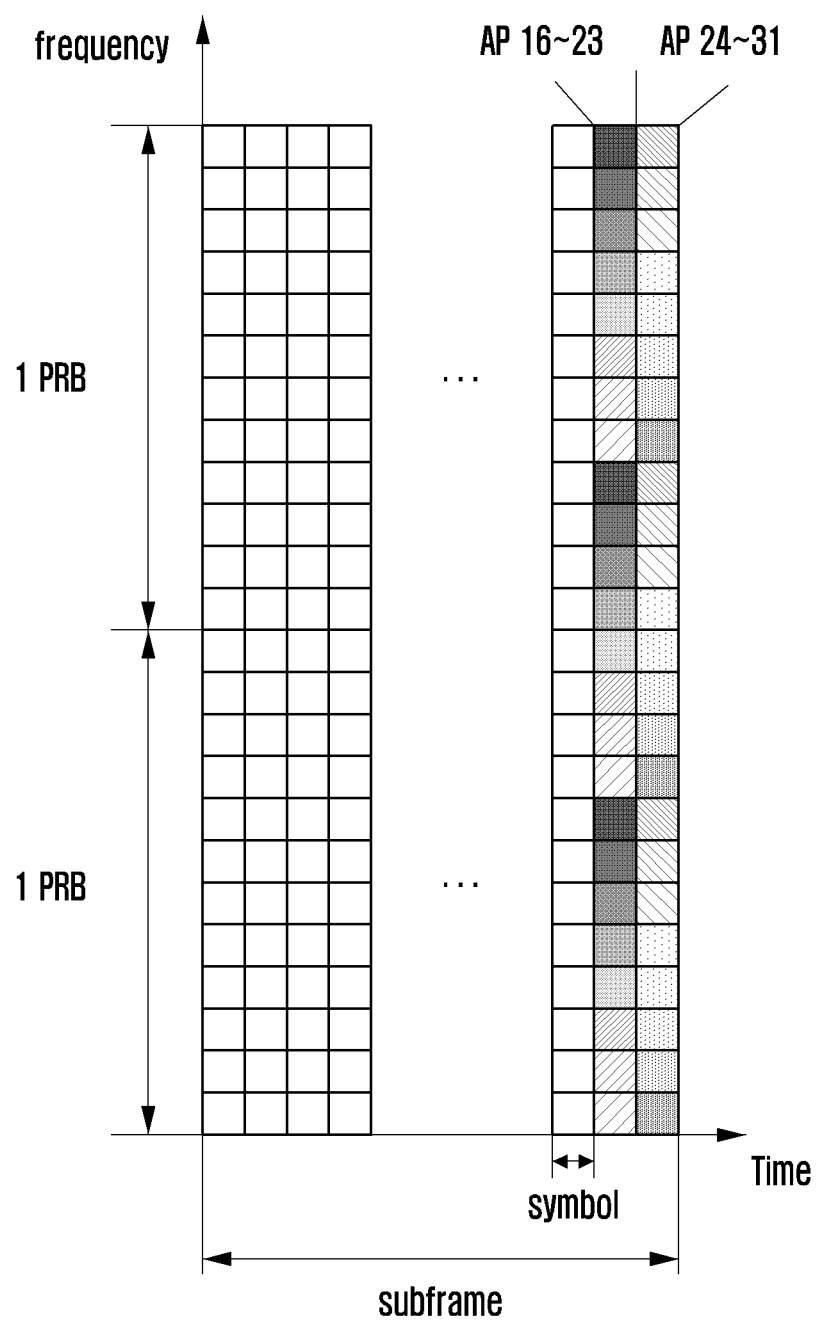

FIGS. 16 and 17 illustrate a signal for I/Q calibration according to an embodiment.

As described above, if an image signal, i.e., a distorted signal of an original signal (or main signal), does not overlap the original signal, the signal may be used for I/Q calibration.

Accordingly, as illustrated in FIG. 16, a user equipment (UE)-specific reference signal transmitted in a physical downlink control channel (PDCCH) transmitted from a base station to a UE may be used for I/Q calibration.

The DMRS described in a portion related to FIG. 6 is one of uplink reference signals transmitted from a UE to a base station. If a DMRS is used, I/Q calibration may be performed in the transceiver of a UE.

A UE-specific reference signal illustrated in FIG. 16 is one of downlink reference signals transmitted from a base station to a UE. If the UE-specific reference signal is used, I/Q calibration may be performed in the transceiver of the base station.

As illustrated in FIG. 16, the UE-specific reference signal may be transmitted at given intervals in a frequency domain. The image signal of an original signal may be generated because the original signal is flipped on the basis of a center frequency.

Alternatively, as illustrated in FIG. 17, a channel status information reference signal (CSI-RS) may be used for I/Q calibration.

Referring to FIG. 17, one CSI-RS may be transmitted at given intervals in the RE of a given PRB. The image signal of an original signal may be generated because the original signal is flipped on the basis of a center frequency.

As described above, if the image signal of an original signal does not overlap the original signal, the corresponding signal may be used for I/Q calibration.

Figure 18:
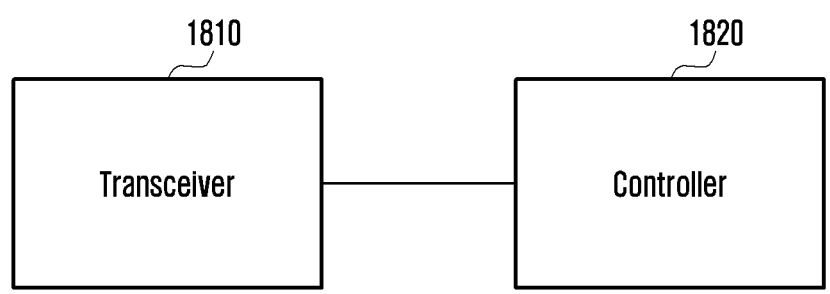
FIG. 18 illustrates a UE according to an embodiment.

FIG. 18 illustrates a UE according to an embodiment.

Referring to FIG. 18, the UE includes a transceiver 1810 and a controller 1820 configured to control an overall operation of the UE. The transceiver 1810 may include a transmitter and a receiver. For example, the transceiver 1810 may be the transceiver 700 as illustrated in FIG. 7.

The controller 1820 controls the UE to perform any one operation of the above-described embodiments. For example, the controller 1820 of the UE may control to form a loopback path between the transmitter and the receiver, transmit a preconfigured signal from the transmitter to the receiver through the loopback path, identify an image signal, i.e., a distorted signal of the preconfigured signal, calculate a gain error value and a phase error value using the preconfigured signal and the image signal, and perform I/Q calibration based on the gain error value and the phase error value.

The transceiver 1810 may transmit and receive signals based on any one operation of the above-described embodiments. The transmitter may transmit a preconfigured signal to a different network entity or receiver. The receiver may calculate a gain error value and a phase error value based on the preconfigured signal.

The controller 1820 and the transceiver 1810 do not need to be essentially implemented as separate modules, but may be implemented in a form, such as a single chip. The controller 1820 and the transceiver 1810 may be electrically connected.

The controller 1820 may be a circuit, an application-specific circuit, or at least one processor. The operations of the UE may be realized by including a memory device (or storage unit) in which a corresponding program code has been stored in an element within the UE. That is, the controller 1820 may execute the above-described operations by reading a program code stored in the memory device by a processor or CPU and executing the program code.

Figure 19:
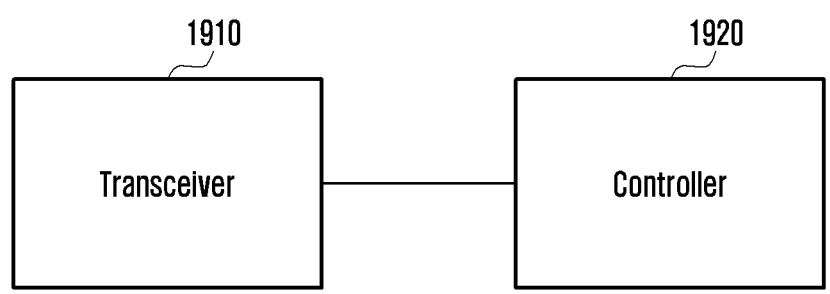
FIG. 19 illustrates a base station according to an embodiment.

FIG. 19 illustrates a base station according to an embodiment.

Referring to FIG. 19, the base station includes a transceiver 1910 and a controller 1920 configured to control an overall operation of the base station. The transceiver 1910 may include a transmitter and a receiver. For example, the transceiver 1910 may be the transceiver 700 illustrated in FIG. 7.

The controller 1920 controls the base station to perform any one operation of the above-described embodiments. For example, the controller 1920 may control to form a loopback path between the transmitter and the receiver, transmit a preconfigured signal from the transmitter to the receiver through a loopback path, identify an image signal, that is, a distorted signal of the preconfigured signal, calculate a gain error value and a phase error value using the preconfigured signal and the image signal, and perform I/Q calibration based on the gain error value and the phase error value.

The transceiver 1910 of the base station may transmit and receive signals based on any one operation of the above-described embodiments. The transmitter may transmit a preconfigured signal to a different network entity or receiver. The receiver may calculate a gain error value and a phase error value based on the preconfigured signal.

The controller 1920 and the transceiver 1910 do not need to be essentially implemented as separate modules, but may be implemented in a form, such as a single chip. The controller 1920 and the transceiver 1910 may be electrically connected.

The controller 1920 may be a circuit, an application-specific circuit, or at least one processor. The operations of the base station may be realized by including a memory device (or storage unit) in which a corresponding program code has been stored in an element within the base station. That is, the controller 1920 may execute the above-described operations by reading a program code stored in the memory device by a processor or CPU and executing the program code.

According to an embodiment of the disclosure, a method and apparatus are provided for I/Q calibration to be performed in real time.

Runtime calibration can be performed based on an environment change, such as a temperature variation, aging, or a voltage variation, in addition to factory calibration.

A method is also provided for communication to be continuously performed without being stopped during calibration.

Effects of the disclosure are not limited to the above-described effects, and other technical effects not described above may be evidently understood by those skilled in the art to which the disclosure pertains from the following description.

The embodiments of the disclosure disclosed in the specification and drawings have suggested given examples in order to easily describe the technical contents of the disclosure and to help understanding of the disclosure, and are not intended to limit the scope of the disclosure. That is, it is evident to those skilled in the art to which the disclosure pertains that other modified examples based on technical spirit of the disclosure may be practiced. Further, the embodiments may be combined and operated, if necessary.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An in-phase/quadrature (I/Q) calibration method of a transceiver, the method comprising:
    configuring a loopback path between a transmitter and a receiver;
    transmitting a preconfigured signal from the transmitter to the receiver through the loopback path;
    identifying an image signal, wherein the image signal includes a distorted signal of the preconfigured signal;
    determining a gain error value and a phase error value based on the preconfigured signal and the image signal; and
    performing I/Q calibration based on the gain error value and the phase error value,
    wherein a subcarrier in which the preconfigured signal is transmitted and a subcarrier in which the image signal is generated do not overlap, and
    wherein the preconfigured signal includes at least one of an uplink demodulation reference signal (DMRS), a downlink UE-specific reference signal, or a channel status information reference signal (CSI-RS).

2. The method of claim 1, wherein identifying the image signal comprises:
    identifying timing in which the preconfigured signal is transmitted in a first component carrier (CC); and
    identifying the image signal generated in a second CC based on the timing in which the preconfigured signal is transmitted.

3. The method of claim 2, wherein identifying the image signal further comprises:
    identifying the subcarrier in which the preconfigured signal is transmitted in the first CC; and
    identifying the subcarrier in which the image signal is generated in the second CC.

4. The method of claim 1, wherein the preconfigured signal is periodically transmitted in subcarriers of a plurality of resource blocks (RBs) included in a plurality of component carriers (CCs), and
    wherein the image signal is generated in subcarriers not overlapping the subcarriers in which the preconfigured signal is transmitted.

5. The method of claim 1, wherein determining the gain error value and the phase error value comprises:
    determining the gain error value by multiplying a real number value of a value, obtained by dividing the image signal by a conjugate of the preconfigured signal, by 2, and
    determining the phase error value by multiplying an imaginary number value of the value, obtained by dividing the image signal by the conjugate of the preconfigured signal, by 2.

6. The method of claim 1, wherein determining the gain error value and the phase error value comprises:
    determining a gain error value of the transmitter, a phase error value of the transmitter, a gain error value of the receiver, and a phase error value of the receiver according to:

$$E(\omega) \approx A(\omega)^{-1} \cdot F_I(\omega) \text{ wherein}$$

$$E(\omega) = \begin{bmatrix} \varepsilon_R(\omega) + j \cdot \varphi_R(\omega) \\ \varepsilon_T(\omega) + j \cdot \varphi_T(\omega) \end{bmatrix},$$

$$A(\omega) = \frac{1}{2}\begin{bmatrix} e^{-j\phi_0} & e^{+j\phi_0} \\ e^{-j\phi_{90}} & e^{+j\phi_{90}} \end{bmatrix},$$

$$F_I(\omega) = \begin{bmatrix} F_{R\_Image\phi_0}(\omega) / \left(F_{R\_Main\phi_0}(-\omega) \cdot e^{-j\phi_0}\right)^* \\ F_{R\_Image\phi_{90}}(\omega) / \left(F_{R\_Main\phi_{90}}(-\omega) \cdot e^{-j\phi_{90}}\right)^* \end{bmatrix},$$

$\varepsilon_T$ is the gain error value of the transmitter, $\varphi_T$ is the phase error value of the transmitter, $\varepsilon_R$ is the gain error value of the receiver, $\varphi_R$ is the phase error value of the receiver, $\emptyset$ is a phase of a phase shifter, $F_{R\_Image}$ is the image signal, and $F_{R\_Main}$ is the preconfigured signal.

7. A transceiver performing an in-phase/quadrature (I/Q) calibration, the transceiver comprising:
    a transmitter configured to transmit a preconfigured signal;
    a receiver configured to determine a gain error value and a phase error value based on the preconfigured signal; and
    a controller configured to:
        configure a loopback path between a transmitter and a receiver,
        transmit the preconfigured signal from the transmitter to the receiver through the loopback path,
        identify an image signal, wherein the image signal includes a distorted signal of the preconfigured signal,
        determine a gain error value and a phase error value based on the preconfigured signal and the image signal, and
        perform I/Q calibration based on the gain error value and the phase error value,
    wherein a subcarrier in which the preconfigured signal is transmitted and a subcarrier in which the image signal is generated do not overlap, and
    wherein the preconfigured signal includes at least one of an uplink demodulation reference signal (DMRS), a downlink UE-specific reference signal, or a channel status information reference signal (CSI-RS).

8. The transceiver of claim 7, wherein the controller is further configured to:
    identify timing in which the preconfigured signal is transmitted in a first component carrier (CC), and
    identify the image signal generated in a second CC based on the timing in which the preconfigured signal is transmitted.

9. The transceiver of claim 8, wherein the controller is further configured to:
    identify the subcarrier in which the preconfigured signal is transmitted in the first CC, and
    identify the subcarrier in which the image signal is generated in the second CC.

10. The transceiver of claim 7, wherein the preconfigured signal is periodically transmitted in subcarriers of a plurality of resource blocks (RBs) included in a plurality of component carriers (CCs), and
    wherein the image signal is generated in subcarriers not overlapping the subcarriers in which the preconfigured signal is transmitted.

11. The transceiver of claim 7, wherein the controller is further configured to:
    determine the gain error value by multiplying a real number value of a value, obtained by dividing the image signal by a conjugate of the preconfigured signal, by 2, and
    determine the phase error value by multiplying an imaginary number value of the value, obtained by dividing the image signal by the conjugate of the preconfigured signal, by 2.

12. The transceiver of claim 7, wherein the controller is further configured to determine a gain error value of the transmitter, a phase error value of the transmitter, a gain error value of the receiver, and a phase error value of the receiver according to:

$$E(\omega) \approx A(\omega)^{-1} \cdot F_I(\omega) \text{ wherein}$$

$$E(\omega) = \begin{bmatrix} \varepsilon_R(\omega) + j \cdot \varphi_R(\omega) \\ \varepsilon_T(\omega) + j \cdot \varphi_T(\omega) \end{bmatrix},$$

$$A(\omega) = \frac{1}{2} \begin{bmatrix} e^{-j\emptyset_0} & e^{+j\emptyset_0} \\ e^{-j\emptyset_{90}} & e^{+j\emptyset_{90}} \end{bmatrix},$$

$$F_I(\omega) = \begin{bmatrix} F_{R\_Image\emptyset_0}(\omega) / \left(F_{R\_Main\emptyset_0}(-\omega) \cdot e^{-j\emptyset_0}\right)^* \\ F_{R\_Image\emptyset_{90}}(\omega) / \left(F_{R\_Main\emptyset_{90}}(-\omega) \cdot e^{-j\emptyset_{90}}\right)^* \end{bmatrix},$$

$\varepsilon_T$ is the gain error value of the transmitter, $\varphi_T$ is the phase error value of the transmitter, $\varepsilon_R$ is the gain error value of the receiver, $\varphi_R$ is the phase error value of the receiver, $\emptyset$ is a phase of a phase shifter, $F_{R\_Image}$ is the image signal, and $F_{R\_Main}$ is the preconfigured signal.

* * * * *